US012755668B2

(12) United States Patent
Lim et al.

(10) Patent No.: US 12,755,668 B2
(45) Date of Patent: Oct. 6, 2026

(54) DISPLAY DEVICE AND ELECTRONIC DEVICE INCLUDING DISPLAY DEVICE

(71) Applicant: Samsung Display Co., LTD., Yongin-si (KR)

(72) Inventors: Jae Keun Lim, Yongin-si (KR); Bon Seog Gu, Yongin-si (KR); Jin Young Roh, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 19/196,263

(22) Filed: May 1, 2025

(65) Prior Publication Data

US 2025/0342790 A1 Nov. 6, 2025

(30) Foreign Application Priority Data

May 3, 2024 (KR) ........................ 10-2024-0059144

(51) Int. Cl.

*G09G 3/20* (2006.01)
*G09G 3/3233* (2016.01)
*G09G 3/36* (2006.01)

(52) U.S. Cl.

CPC ......... *G09G 3/2074* (2013.01); *G09G 3/3233* (2013.01); *G09G 3/3607* (2013.01); *G09G 2300/0804* (2013.01); *G09G 2300/0819* (2013.01); *G09G 2300/0852* (2013.01); *G09G 2310/06* (2013.01); *G09G 2310/08* (2013.01); *G09G 2320/0233* (2013.01); *G09G 2330/023* (2013.01)

(58) Field of Classification Search

CPC .. G09G 3/2074; G09G 3/3233; G09G 3/3607; G09G 2300/0804; G09G 2300/0819; G09G 2300/0852; G09G 2310/06; G09G 2310/08; G09G 2320/0233; G09G 2330/023

See application file for complete search history.

(56) References Cited

U.S. PATENT DOCUMENTS

2025/0252920 A1 * 8/2025 Park ..................... G09G 3/3233
2025/0372034 A1 * 12/2025 Wang .................. G09G 3/3233

FOREIGN PATENT DOCUMENTS

KR 102633406 B1 * 2/2024 ........... G09G 3/3233

OTHER PUBLICATIONS

English translation of KR-102633406-B1 (Year: 2024).*

* cited by examiner

*Primary Examiner* — Lixi C Simpson
(74) *Attorney, Agent, or Firm* — Womble Bond Dickinson (US) LLP

(57) ABSTRACT

A display device includes: a first sub-pixel and a second sub-pixel. The first sub-pixel includes: a first transistor connected between a first node and a second node, and including a gate electrode connected to a third node; a second transistor connected between the third node and a fourth node; a first capacitor connected between the second node and the third node; and a first light emitting element connected between the second node and a second power line. The second sub-pixel includes: a third transistor connected between a fifth node and a sixth node, and including a gate electrode connected to the fourth node; a fourth transistor connected between a j-th data line and the fourth node; a second capacitor connected between the fourth node and the sixth node; and a second light emitting element connected between the sixth node and the second power line.

12 Claims, 20 Drawing Sheets

DISPLAY DEVICE AND ELECTRONIC DEVICE INCLUDING DISPLAY DEVICE

CROSS-REFERENCE TO RELATED APPLICATION

The present application claims priority to and the benefit of Korean Patent Application No. 10-2024-0059144, filed on May 3, 2024, in the Korean Intellectual Property Office, the entire disclosure of which is incorporated by reference herein.

BACKGROUND

1. Field

Aspects of embodiments of the present disclosure relate to a display device and an electronic device including display device.

2. Description of the Related Art

As information technology is developed, the importance of a display device, which is a connection medium between users and information, has been highlighted. Therefore, a display device, such as a liquid crystal display device, an organic light emitting diode display device, and the like, has been increasingly used.

Recently, a head-mounted display device (HMD) has been developed. The head-mounted display device is a display device that the user wears in the form of glasses or a helmet to implement virtual reality (VR) or augmented reality (AR) that focuses images at a distance close to the user's eyes. High-resolution panels may be used in the head-mounted display device, and thus, pixels that may be applied to the high-resolution panels may be desired.

The above information disclosed in this Background section is for enhancement of understanding of the background of the present disclosure, and therefore, it may contain information that does not constitute prior art.

SUMMARY

One or more embodiments of the present disclosure may be directed to a display device that supplies a data voltage corresponding to each sub-pixel.

According to one or more embodiments of the present disclosure, a display device includes: a first sub-pixel and a second sub-pixel connected to a first scan line, a second scan line, and a j-th data line, where j is an integer greater than or equal to 1, the first scan line being configured to receive a first scan signal, and the second scan line being configured to receive a second scan signal. The first sub-pixel is located at an i-th pixel row and a j-th pixel column, where i is an integer greater than or equal to 0, and includes: a first transistor connected between a first node and a second node, and including a gate electrode connected to a third node, the second node being configured to receive a first driving power supplied from a first power line; a second transistor connected between the third node and a fourth node, and configured to be turned on when the second scan signal is supplied to the second scan line; a first capacitor connected between the second node and the third node; and a first light emitting element connected between the second node and a second power line configured to receive a second driving power. The second sub-pixel is located at the i-th pixel row and a j−1-th pixel column, and includes: a third transistor connected between a fifth node and a sixth node, and including a gate electrode connected to the fourth node, the sixth node being configured to receive the first driving power supplied from the first power line; a fourth transistor connected between the j-th data line and the fourth node, and configured to be turned on when the first scan signal is supplied to the first scan line; a second capacitor connected between the fourth node and the sixth node; and a second light emitting element connected between the sixth node and the second power line.

In an embodiment, the first sub-pixel may further include a fifth transistor connected between the second node and a third power line configured to receive an initialization power, the fifth transistor being configured to be turned on when the first scan signal is supplied to the first scan line; and the second sub-pixel may further include a sixth transistor connected between the sixth node and the third power line, the sixth transistor being configured to be turned on when the first scan signal is supplied to the first scan line.

In an embodiment, during one horizontal period, a supply stop time of the second scan signal may be earlier than a supply stop time of the first scan signal.

In an embodiment, one horizontal period may include a first period and a second period; a start time of the second period may be after an end time of the first period; the first and second scan signals may be supplied during the first period; and the first scan signal may be supplied and a supply of the second scan signal may be stopped during the second period.

In an embodiment, the third node and the fourth node may be configured to receive a first data voltage corresponding to the first sub-pixel during the first period; and the fourth node may be configured to receive a voltage corresponding to the second sub-pixel during the second period.

In an embodiment, one horizontal period may further include a third period; a start time of the first period may be after an end of the third period; and the second scan signal may be supplied and a supply of the first scan signal may be stopped during the third period.

In an embodiment, the first sub-pixel may further include a third capacitor connected between the third node and the first power line.

According to one or more embodiments of the present disclosure, a display device includes: a first sub-pixel and a second sub-pixel connected to a first scan line, a second scan line, a j-th data line, where j is an integer greater than or equal to 1, and emission control lines, the first scan line being configured to receive a first scan signal, and the second scan line being configured to receive a second scan signal. The first sub-pixel is located in an i-th pixel row, where i is an integer greater than or equal to 0, and a j-th pixel column, and includes: a first transistor connected between a first node and a second node, and including a gate electrode connected to a third node; a second transistor connected between the third node and a fourth node, and configured to be turned on when the second scan signal is supplied to the second scan line; a third transistor connected between the first node and a first power line configured to receive a first driving power, and configured to be turned on when a first emission signal is supplied to a first emission control line from among the emission control lines; a fourth transistor connected between the second node and a fifth node, and configured to be turned on when a second emission signal is supplied to a second emission control line from among the emission control lines; a first capacitor connected between the second node and the third node; and a first light emitting element connected between the fifth node and a second power line configured to receive a second driving power. The second sub-pixel is located in the i-th pixel row and a j−1-th pixel column, and includes: a fifth transistor connected between a sixth node and a seventh node, and including a gate electrode connected to the fourth node; a sixth transistor connected between the j-th data line and the fourth node, and configured to be turned on when the first scan signal is supplied to the first scan line; a seventh transistor connected between the sixth node and the first power line, and configured to be turned on when the first emission signal is supplied to the first emission control line; an eighth transistor connected between the seventh node and an eighth node, and configured to be turned on when the second emission signal is supplied to the second emission control line; a second capacitor connected between the fourth node and the seventh node; and a second light emitting element connected between the eighth node and the second power line.

In an embodiment, the first sub-pixel may further include a ninth transistor connected between the fifth node and a third power line configured to receive an initialization power, the ninth transistor being configured to be turned on when the second scan signal is supplied to the second scan line; and the second sub-pixel may further include a tenth transistor connected between the eighth node and the third power line, the tenth transistor being configured to be turned on when the second scan signal is supplied to the second scan line.

In an embodiment, the first sub-pixel and the second sub-pixel may be further connected to a third scan line configured to receive a third scan signal; the first sub-pixel may further include an eleventh transistor connected between the third node and a fourth power line configured to receive a reference power, the eleventh transistor being configured to be turned on when the third scan signal is supplied to the third scan line; and the second sub-pixel may further include a twelfth transistor connected between the fourth node and the fourth power line, the twelfth transistor being configured to be turned on when the third scan signal is supplied to the third scan line.

In an embodiment, a voltage level of the reference power may be higher than a voltage level of the initialization power.

In an embodiment, the first sub-pixel may further include a third capacitor connected between the second node and the first power line; and the second sub-pixel may further include a fourth capacitor connected between the seventh node and the first power line.

In an embodiment, during one horizontal period, a supply stop time of the second scan signal may be earlier than a supply stop time of the first scan signal.

In an embodiment, one horizontal period may include first to fifth periods; a start time of the second period may be after an end time of the first period; the second scan signal, the third scan signal, and the second emission signal may be supplied, and a supply of the first scan signal and the first emission signal may be stopped during the first period; and the second scan signal, the third scan signal, and the first emission signal may be supplied, and a supply of the first scan signal and the second emission signal may be stopped during the second period.

In an embodiment, a start time of the third period may be after an end time of the second period; and the first scan signal and the second scan signal may be supplied, and a supply of the third scan signal, the first emission signal, and the second emission signal may be stopped during the third period.

In an embodiment, the third node and the fourth node may be configured to receive a first data voltage corresponding to the first sub-pixel during the third period.

In an embodiment, a start time of the fourth period may be after an end of the third period; and the first scan signal may be supplied, and a supply of the second scan signal, the third scan signal, the first emission signal, and the second emission signal may be stopped during the fourth period.

In an embodiment, the fourth node may be configured to receive a second data voltage corresponding to the second sub-pixel during the fourth period.

In an embodiment, a start time of the fifth period may be after an end of the fourth period; and the second scan signal and the second emission signal may be supplied, and a supply of the first scan signal, the third scan signal, and the first emission signal may be stopped during the fifth period.

In an embodiment, after the fifth period, a supply of the first to third scan signals may be stopped, and the first and second emission signals may be supplied.

According to some embodiments of the present disclosure, a display device may supply a data voltage corresponding to each sub-pixel without using or including a separate demultiplexer.

According to one or more embodiments of the present disclosure, an electronic device includes a processor to provide input image data; and a display device to display an image based on the input image data. The display device includes: a first sub-pixel and a second sub-pixel connected to a first scan line, a second scan line, and a j-th data line, where j is an integer greater than or equal to 1, the first scan line being configured to receive a first scan signal, and the second scan line being configured to receive a second scan signal. The first sub-pixel is located at an i-th pixel row and a j-th pixel column, where i is an integer greater than or equal to 0, and includes: a first transistor connected between a first node and a second node, and including a gate electrode connected to a third node, the second node being configured to receive a first driving power supplied from a first power line; a second transistor connected between the third node and a fourth node, and configured to be turned on when the second scan signal is supplied to the second scan line; a first capacitor connected between the second node and the third node; and a first light emitting element connected between the second node and a second power line configured to receive a second driving power. The second sub-pixel is located at the i-th pixel row and a j−1-th pixel column, and includes: a third transistor connected between a fifth node and a sixth node, and including a gate electrode connected to the fourth node, the sixth node being configured to receive the first driving power supplied from the first power line; a fourth transistor connected between the j-th data line and the fourth node, and configured to be turned on when the first scan signal is supplied to the first scan line; a second capacitor connected between the fourth node and the sixth node; and a second light emitting element connected between the sixth node and the second power line.

However, the present disclosure is not limited to the above aspects and features, and the above and additional aspects and features will be set forth, in part, in the detailed description that follows with reference to the drawings, and in part, may be apparent therefrom, or may be learned by practicing one or more of the presented embodiments of the present disclosure.

BRIEF DESCRIPTION OF THE DRAWINGS

The above and other aspects and features of the present disclosure will be more clearly understood from the following detailed description of the illustrative, non-limiting embodiments with reference to the accompanying drawings.

DETAILED DESCRIPTION

Figure 1:
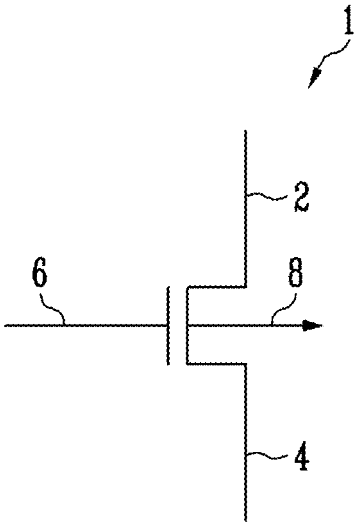
FIG. 1 illustrates a transistor according to an embodiment of the present disclosure.

Hereinafter, embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, redundant description thereof may not be repeated.

When a certain embodiment may be implemented differently, a specific process order may be different from the described order. For example, two consecutively described processes may be performed at the same or substantially at the same time, or may be performed in an order opposite to the described order.

Further, as would be understood by a person having ordinary skill in the art, in view of the present disclosure in its entirety, each suitable feature of the various embodiments of the present disclosure may be combined or combined with each other, partially or entirely, and may be technically interlocked and operated in various suitable ways, and each embodiment may be implemented independently of each other or in conjunction with each other in any suitable manner, unless otherwise stated or implied.

In the drawings, the relative sizes, thicknesses, and ratios of elements, layers, and regions may be exaggerated and/or simplified for clarity. Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

Further, it should be expected that the shapes shown in the figures may vary in practice depending, for example, on tolerances and/or manufacturing techniques. Accordingly, the embodiments of the present disclosure should not be construed as being limited to the specific shapes shown in the figures, and should be construed considering changes in shapes that may occur, for example, as a result of manufacturing. As such, the shapes shown in the drawings may not depict the actual shapes of areas of the device, and the present disclosure is not limited thereto.

In the figures, the x-axis, the y-axis, and the z-axis are not limited to three axes of the rectangular coordinate system, and may be interpreted in a broader sense. For example, the x-axis, the y-axis, and the z-axis may be perpendicular to or substantially perpendicular to one another, or may represent different directions from each other that are not perpendicular to one another.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "on," "connected to," or "coupled to" another element or layer, it can be directly on, connected to, or coupled to the other element or layer, or one or more intervening elements or layers may be present. Similarly, when a layer, an area, or an element is referred to as being "electrically connected" to another layer, area, or element, it may be directly electrically connected to the other layer, area, or element, and/or may be indirectly electrically connected with one or more intervening layers, areas, or elements therebetween. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, the expression "A and/or B" denotes A, B, or A and B. Expressions such as "at least one of," when preceding a list of elements, modify the entire list of elements and do not modify the individual elements of the list. For example, the expression "at least one of a, b, or c," "at least one of a, b, and c," and "at least one selected from the group consisting of a, b, and c" indicates only a, only b, only c, both a and b, both a and c, both b and c, all of a, b, and c, or variations thereof.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

FIG. 1 illustrates a transistor according to an embodiment of the present disclosure.

Referring to FIG. 1, a transistor 1 according to an embodiment of the present disclosure may include a first electrode 2, a second electrode 4, a gate electrode 6, and a body electrode 8. For example, the transistor 1 may be a metal-oxide-semiconductor field-effect transistor (MOSFET). Because the transistor 1 (e.g., MOSFET) including the body electrode 8 may have a smaller mounting area, it may be suitable for implementing high-resolution pixels.

The transistor 1 may be formed on a silicon wafer. For example, a panel may be implemented by stacking a transistor layer, a light emitting layer, a cover layer, and the like on the silicon wafer. However, the present disclosure is not limited thereto, and the transistor 1 may be formed on various suitable substrates (e.g., a glass substrate) known to those having ordinary skill in the art.

The first electrode 2 of the transistor 1 may be a drain electrode (or a source electrode), and the second electrode 4 of the transistor 1 may be a source electrode (or a drain electrode). When the transistor 1 includes the body electrode 8, a threshold voltage of the transistor 1 may be changed by a body effect. The body effect refers to the threshold voltage of the transistor 1 that changes due to a voltage difference between the body electrode 8 and the source electrode (e.g., the second electrode 4) of the transistor 1.

For example, when a voltage level of the source electrode 4 is higher than a voltage level of the body electrode 8, the threshold voltage may increase. When the threshold voltage of the transistor 1 changes, a magnitude of a current flowing from the drain electrode 2 to the source electrode 4 of the transistor 1 may change.

According to some embodiments of the present disclosure, a compensation of the threshold voltage may be possible while using the transistor 1 as a driving transistor.

Figure 2:
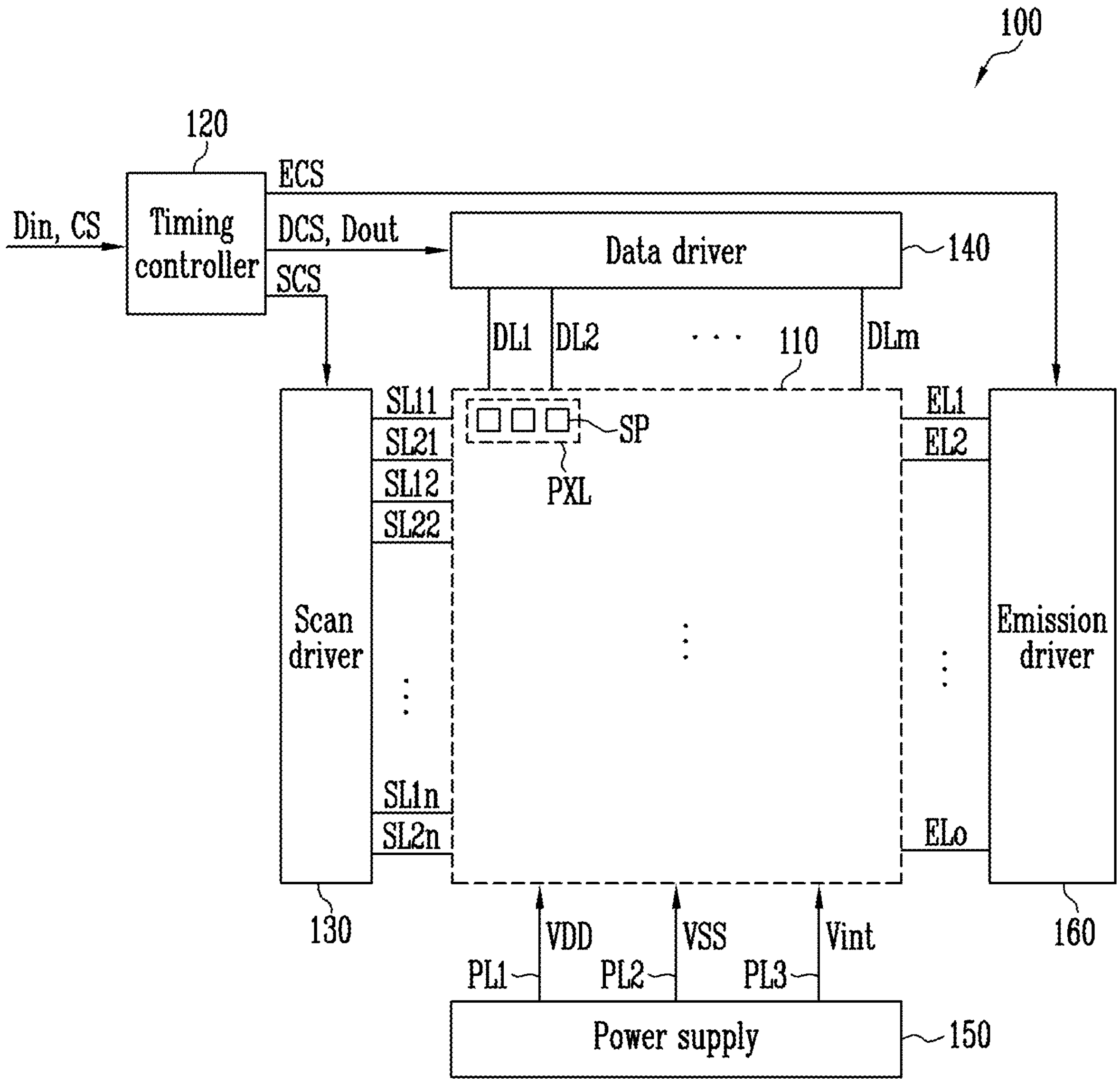
FIG. 2 is a block diagram illustrating a display device according to an embodiment of the present disclosure.
Figure 3:
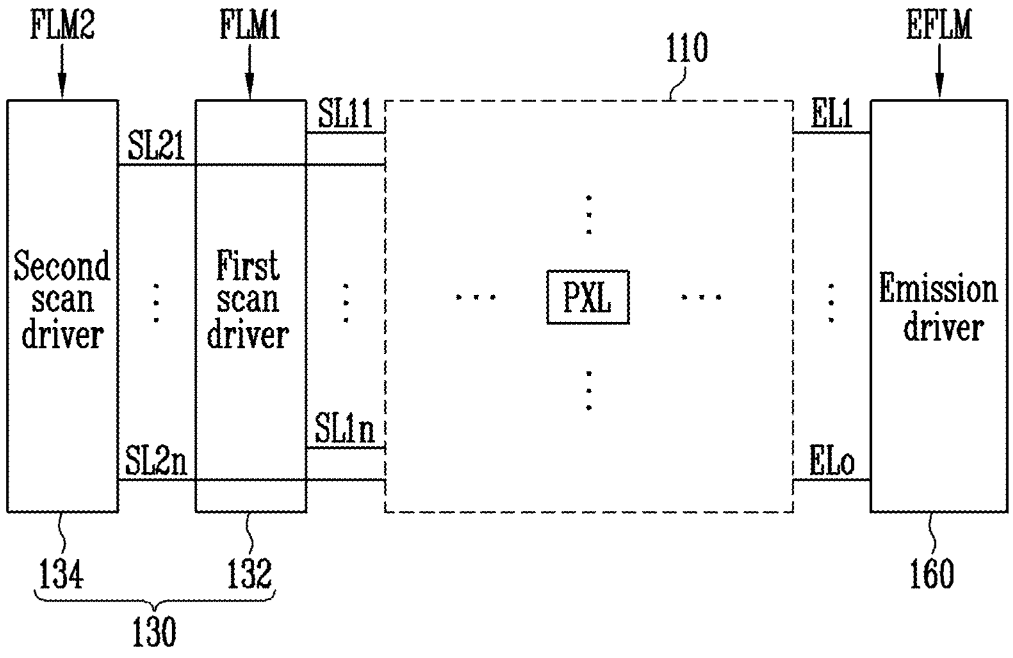
FIG. 3 is a block diagram illustrating a scan driver, a data driver, and a power supply shown in FIG. 2, according to an embodiment of the present disclosure.

FIG. 2 is a block diagram illustrating a display device according to an embodiment of the present disclosure. FIG. 3 is a block diagram illustrating a scan driver, a data driver, and a power supply shown in FIG. 2, according to an embodiment of the present disclosure.

Referring to FIG. 2, the display device 100 according to an embodiment of the present disclosure includes a pixel unit 110 (e.g., a pixel panel), a timing controller 120, a scan driver 130, a data driver 140, a power supply 150, and a emission driver 160. Some of these elements may be implemented as separate integrated circuits, and two or more of these elements may be integrated and implemented as one integrated circuit. In some embodiments, the scan driver 130 and/or the emission driver 160 may be formed in the pixel unit 110.

The pixel unit 110 may include sub-pixels SP connected to first scan lines SL11 to SL1*n*, second scan lines SL21 to SL2*n*, data lines DL1 to DLm, emission control lines EL1 to ELo, and power lines PL1, PL2, and PL3, where n, m, and o are integers greater than or equal to zero.

In FIG. 2, the sub-pixels SP is shown as being connected to the first scan lines SL11 to SL1*n*, the second scan lines SL21 to SL2*n*, the data lines DL1 to DLm, the emission control lines EL1 to ELo, and the power lines PL1, PL2, and PL3, but the present disclosure is not limited thereto, and in some embodiments, the sub-pixels SP may be further connected to third scan lines, fourth scan lines, and a fourth power line.

Each of the sub-pixels SP may include at least one light emitting element to generate light. Accordingly, each of the sub-pixels SP may generate light of a desired color (e.g., a specific or predetermined color), such as red, green, blue, cyan, magenta, yellow, or the like. Two or more sub-pixels from among the sub-pixels SP may constitute one pixel PXL. For example, as shown in FIG. 1, three sub-pixels SP may constitute one pixel PXL.

A sub-pixel SPij (e.g., see FIG. 4) disposed on an i-th horizontal line (e.g., an i-th pixel row) and a j-th vertical line (e.g., a j-th pixel column) may be connected to the first scan line SL1*i*, the second scan line SL2*i*, a k-th emission control line ELk, and a j-th data line DLj, where i is an integer smaller than or equal to n, j is an integer smaller than or equal to m, and k is an integer smaller than or equal to o). For example, k may be a number equal to i or smaller than i. As an example, when each of the emission control lines EL1 to ELo is connected to the sub-pixels SP disposed on one horizontal line, k may be the same number as i. As another example, when each of the emission control lines EL1 to ELo is connected to the sub-pixels SP disposed on two or more horizontal lines, k may be a number smaller than i.

When the first scan signal is supplied to each of the first scan lines SL11 to SL1$n$, the sub-pixels SP may be selected in horizontal line units (e.g., sub-pixels SP connected to the same scan line may be classified into one horizontal line or one pixel row). The sub-pixels SP selected by the first scan signal may receive a data signal from a data line (e.g., any corresponding one of DL1 to DLm) connected to the sub-pixels SP. The sub-pixels SP that receive the data signal may generate light having a desired luminance (e.g., a certain or predetermined luminance) in response to the voltage of the data signal.

While some of the drawings illustrate that the sub-pixels SP are connected to the first and second scan lines SL1$i$ and SL2$i$, the k-th emission control line ELk, and the j-th data line DLj, the present disclosure is not limited thereto, and the sub-pixels SP may be connected to two or more scan lines and two or more emission control lines.

The timing controller 120 may receive input data Din and a control signal CS from a host system through an interface. For example, the timing controller 120 may receive the input data Din and the control signal CS from at least one of a graphics processing unit GPU, a central processing unit CPU, or an application processor AP included in the host system. The control signal CS may include various suitable signals including a clock signal.

The timing controller 120 may generate a scan drive signal SCS, a data drive signal DCS, and an emission drive signal ECS based on the control signal CS. The scan drive signal SCS, the data drive signal DCS, and the emission drive signal ECS may be supplied to the scan driver 130, the data driver 140, and the emission driver 160, respectively.

The timing controller 120 may arrange or rearrange the input data Din to match the specifications of the display device 100. Additionally, the timing controller 120 may correct the input data Din to generate output data Dout, and may supply the output data Dout to the data driver 140. In some embodiments, the timing controller 120 may correct the input data Din in response to optical measurement results that are measured during a process.

The scan driver 130 may receive a scan drive signal SCS from the timing controller 120. The scan drive signal SCS may include at least one scan start signal and/or may further include at least one clock signal used for driving of the scan driver 130. The scan driver 130 may generate a first scan signal and a second scan signal, while shifting the scan start signal in response to the clock signal.

As such, the scan driver 130 may include a first scan driver 132 and a second scan driver 134, as shown in FIG. 3.

The first scan driver 132 may receive a first scan start signal FLM1, and may generate the first scan signal while shifting the first scan start signal FLM1 in response to the clock signal. The first scan driver 132 may sequentially supply the first scan signal to the first scan lines SL11 to SL1$n$.

The second scan driver 134 may receive a second scan start signal FLM2, and may generate the second scan signal while shifting the second scan start signal FLM2 in response to the clock signal. The second scan driver 134 may sequentially supply the second scan signal to the second scan lines SL21 to SL2$n$. The first scan signal and the second scan signal may have (e.g., may be set to) a gate-on voltage, so that the transistor included in the pixels PXL may be turned on.

For example, the first and second scan signals at a low-level may be supplied to a P-type transistor, and the first and second scan signals at a high-level may be supplied to an N-type transistor. The transistor receiving the first scan signal or the second scan signal may be turned on in response to the first scan signal or the second scan signal. As used herein, supplying of the first scan signal and the second scan signal may mean that the gate-on voltage is supplied to the first and second scan lines SL1$i$ and SL2$i$. Further, as used herein, stopping of the supply of the first and second scan signals may mean that the gate-off voltage is supplied to the first and second scan lines SL1$i$ and SL2$i$.

Although FIG. 3 shows the first scan driver 132 connected to the first scan lines SL11 to SL1$n$ and the second scan driver 134 connected to the second scan lines SL21 to SL2$n$, the present disclosure is not limited thereto. For example, the first scan lines SL11 to SL1$n$ and the second scan lines SL21 to SL2$n$ may be driven by one scan driver.

The data driver 140 may receive the output data Dout and the data driving signal DCS from the timing controller 120. The data driving signal DCS may include sampling signals and/or timing signals used for driving of the data driver 140.

The data driver 140 may generate a data signal based on the data driving signal DCS and the output data Dout. For example, the data driver 140 may generate an analog data signal based on a gray level (e.g., a grayscale level) of the output data Dout.

The data driver 140 may apply a constant or substantially constant voltage to the data lines DL1 to DLm based on the generated analog data signal. For example, referring to FIG. 5, the data driver 140 may supply a voltage of the data signal Vdata to the data lines DL1 to DLm during one horizontal period (1H).

In some embodiments, the display device 100 may include demultiplexers for supplying the voltage Vdata of the data signal corresponding to each of the sub-pixels SP. The demultiplexers may supply the voltage applied to each of the data lines DL1 to DLm to the corresponding sub-pixels SP. For example, a first voltage from among the voltages applied to the first data line DL1 may be supplied to a first sub-pixel, and a second voltage from among the voltages applied to the first data line DL1 may be supplied to a second sub-pixel. As power is used to drive the demultiplexers, omitting the demultiplexers may be desired.

The power supply 150 may generate various suitable powers (e.g., voltages) used to drive the display device 100. For example, the power supply 150 may generate a first driving power VDD, a second driving power VSS, and an initialization power Vint.

The first driving power VDD may be a power that supplies a driving current to the sub-pixels SP. The second driving power VSS may be a power that receives the driving current from the sub-pixels SP. During a period in which the sub-pixels SP emit light, the first driving power VDD may have a higher voltage than that of the second driving power VSS.

The initialization power Vint may be a voltage that initializes a first electrode (e.g., an anode electrode) of the light emitting elements LD1 and LD2 (e.g., see FIG. 4) included in the sub-pixels SP. The initialization power Vint may have a voltage value that turns off the light emitting element LD (e.g., LD1 and/or LD2) when supplied to the first electrode of the light emitting element LD.

The first driving power VDD generated by the power supply 150 may be supplied to a first power line PL1, the second driving power VSS may be supplied to a second power line PL2, and the initialization power Vint may be supplied to a third power line PL3. The first power line PL1, the second power line PL2, and the third power line PL3 may be commonly connected to the sub-pixels SP, but the present disclosure is not limited thereto.

In some embodiments, the power supply 150 may generate a reference power VRF (e.g., see FIG. 11) having a voltage level greater than that of the initialization power Vint. The power supply 150 may supply the reference power VRF to the sub-pixels SP through a fourth power line PL4 (e.g., see FIG. 11).

In some embodiments, the first power line PL1 may be composed of a plurality of power lines, and the plurality of power lines may be connected to different sub-pixels SP from each other.

In some embodiments, the second power line PL2 may be composed of a plurality of power lines, and the plurality of power lines may be connected to different sub-pixels SP from each other.

In some embodiments, the third power line PL3 may be composed of a plurality of power lines, and the plurality of power lines may be connected to different sub-pixels SP from each other. In some embodiments, the sub-pixels SP may be connected to one of the first power lines PL1, one of the second power lines PL2, and one of the third power lines PL3.

The emission driver 160 may receive the emission drive signal ECS from the timing controller 120. The emission drive signal ECS may include an emission start signal and at least one clock signal used for driving of the emission driver 160. The emission driver 160 may generate emission signals while shifting the emission start signal in response to the clock signal. The emission driver 160 may sequentially supply the emission signals to the emission control lines EL1 to ELo. The emission signal may have (e.g., may be set to) a gate-on voltage, so that the transistor included in the sub-pixels SP may be turned on.

As used herein, the supplying of the emission signal may mean that the gate-on voltage is supplied to the emission control lines EL1 to ELo. As used herein, the stopping of the supply of the emission signal may mean that the gate-off voltage is supplied to the emission control lines EL1 to ELo.

Figure 4:
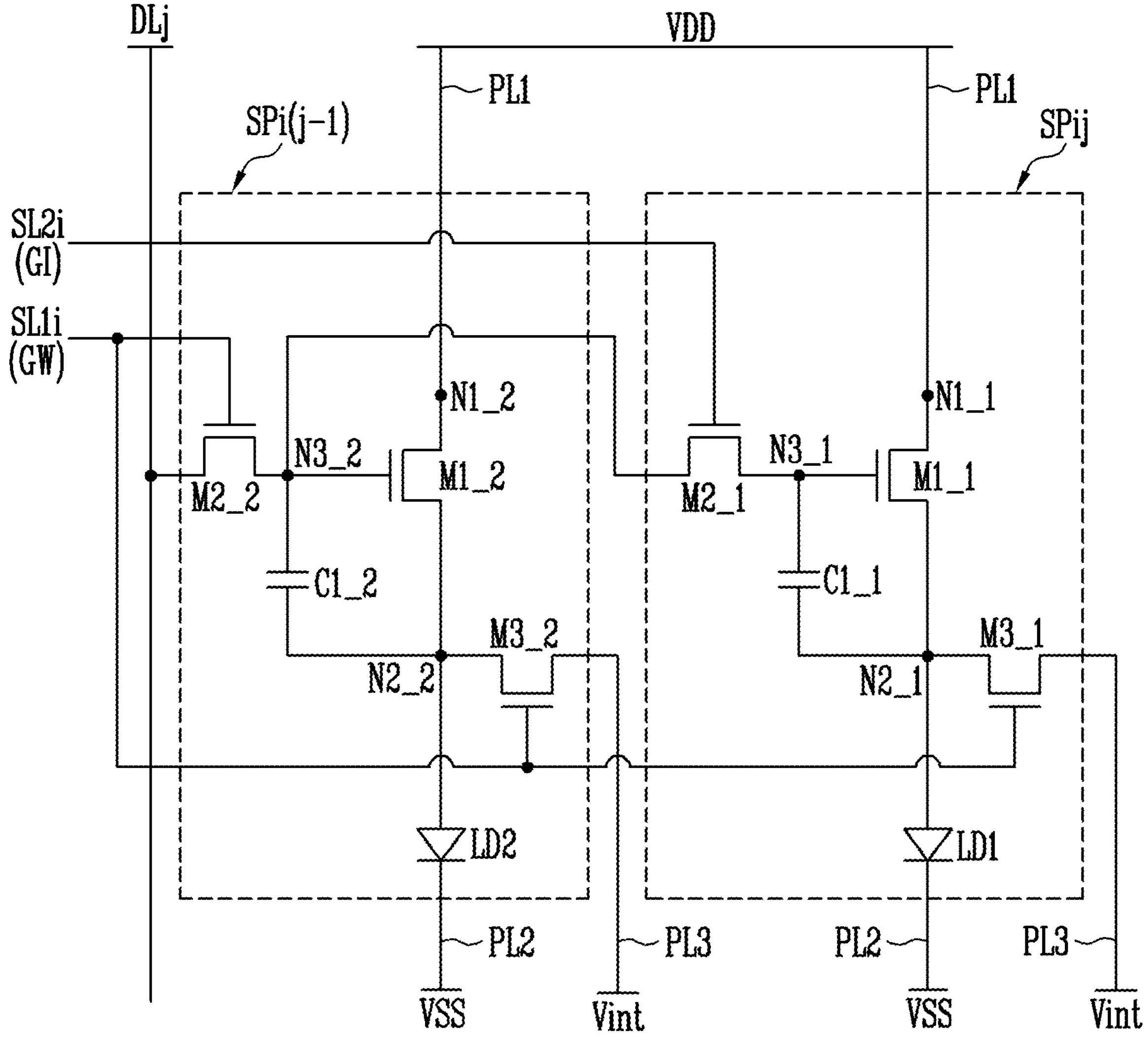
FIG. 4 is a circuit diagram illustrating sub-pixels shown in FIG. 2, according to an embodiment of the present disclosure.

FIG. 4 is a circuit diagram illustrating sub-pixels shown in FIG. 2, according to an embodiment of the present disclosure. FIG. 4 is a drawing showing an embodiment of one of the pixels PXL shown in FIG. 2.

Referring to FIG. 4, a first sub-pixel SPij disposed on the i-th horizontal line and the j-th vertical line, and a second sub-pixel SPi(j−1) disposed on the i-th horizontal line and a j−1-th vertical line are illustrated, where i may be an integer greater than or equal to 0, and j may be an integer greater than or equal to 1.

Each of the first sub-pixel SPij and the second sub-pixel SPi(j−1) may be connected to corresponding signal lines. For example, the first sub-pixel SPij may be connected to the first scan line SL1*i*, the second scan line SL2*i*, and the j-th data line DLj. The second sub-pixel SPi(j−1) may be connected to the first scan line SL1*i*, the second scan line SL2*i*, and the j-th data line DLj. In some embodiments, each of the first sub-pixel SPij and the second sub-pixel SPi(j−1) may be further connected to the first power line PL1, the second power line PL2, and the third power line PL3.

In other words, the first sub-pixel SPij and the second sub-pixel SPi(j−1) may be connected to the same signal lines (e.g., the first scan line SL1*i*, the second scan line SL2*i*, and the j-th data line DLj) as each other. The second sub-pixel SPi(j−1) may be disposed at the same pixel row as that of the first sub-pixel SPij, and may be disposed at a pixel column adjacent to that of the first sub-pixel SPij. Referring to FIG. 2, the first sub-pixel SPij and the second sub-pixel SPi(j−1) may be included in one pixel PXL.

The first sub-pixel SPij according to an embodiment of the present disclosure may include a first light emitting element LD1, and a pixel circuit for controlling an amount of current supplied to the first light emitting element LD1. The second sub-pixel SPi(j−1) may include a second light emitting element LD2, and a pixel circuit for controlling an amount of current supplied to the second light emitting element LD2.

The pixel circuit of the first sub-pixel SPij may include a first transistor M1_1, a second transistor M2_1, a third transistor M3_1, and a first capacitor C1_1.

The first transistor M1_1 to the third transistor M3_1 may be transistors including a body electrode. For example, each of the first to third transistors M1_1 to M3_1 may be a metal oxide semiconductor field effect transistor (MOSFET). In this case, the first transistor M1_1 to the third transistor M3_1 may be mounted in a smaller area, and thus, the sub-pixels SP may be applied to a high-resolution panel. The body electrodes of the first transistor M1_1 to the third transistor M3_1 may receive a ground voltage. The ground voltage may have a higher level than that of the voltage level of the second driving power VSS.

In some embodiments, the second driving power VSS may be provided as the ground voltage. For example, the body electrodes of the first to third transistors M1_1 to M3_1 may be electrically connected to the second power line PL2.

In some embodiments, each of the first to third transistors M1_1 to M3_1 may be formed as an N-type transistor. However, the present disclosure is not limited thereto, and at least one of the first to third transistors M1_1 to M3_1 may be formed as a P-type transistor.

The first electrode of the first transistor M1_1 may be connected to a first node N1_1, and the second electrode thereof may be connected to a second node N2_1. As used herein, the phrase 'being connected' includes being electrically connected. The gate electrode of the first transistor M1_1 may be connected to a third node N3_1. The first node N1_1 may refer to a node to which the second electrode of the third transistor M3_1 is connected, and the second node N2_1 may refer to a node to which the first electrode of the first light emitting element LD1 is connected. The first transistor M1_1 may control an amount of current supplied from the first driving power VDD to the second driving power VSS via the first light emitting element LD1 in response to the voltage of the third node N3_1.

The second transistor M2_1 may be connected between the third node N3_1 and a third node N3_2 of the second sub-pixel SPi(j−1). Further, the gate electrode of the second transistor M2_1 may be electrically connected to the second scan line SL2*i*. The second transistor M2_1 may be turned on when the second scan signal GI is supplied to the second scan line SL2*i* to electrically connect the third node N3_1 and the third node N3_2 to each other.

The first electrode of the third transistor M3_1 may be connected to the second node N2_1, and the second electrode thereof may be electrically connected to the third power line PL3. Further, the gate electrode of the third transistor M3_1 may be electrically connected to the first scan line SL1*i*. The third transistor M3_1 may be turned on when the first scan signal GW is supplied to the first scan line SL1*i* to electrically connect the second node N2_1 and the third power line PL3 to each other.

The first capacitor C1_1 may be connected between the second node N2_1 and the third node N3_1. The first capacitor C1_1 may store and maintain a voltage value depending on a voltage difference applied to opposite electrodes (e.g., both electrodes) thereof.

In some embodiments, the first capacitor C1_1 may be a metal-oxide-metal (MOM) capacitor or a metal-insulator-metal (MIM) capacitor.

The pixel circuit of the second sub-pixel SPi(j−1) may include a first transistor M1_2, a second transistor M2_2, a third transistor M3_2, and a first capacitor C1_2.

The first transistor M1_2, the second transistor M2_2, the third transistor M3_2, and the first capacitor C1_2 of the second sub-pixel SPi(j−1) may be the same or substantially the same as (or similar to) the first transistor M1_1, the second transistor M2_1, the third transistor M3_1, and the first capacitor C1_1, respectively, of the first sub-pixel SPij, and thus, redundant description thereof may not be repeated.

The first electrode of the first transistor M1_2 may be connected to a first node N1_2, and the second electrode thereof may be connected to a second node N2_2. The gate electrode of the first transistor M1_2 may be connected to the third node N3_2. The first node N1_2 may refer to a node electrically connected to the first power line PL1, and the second node N2_2 may refer to a node to which the first electrode of the second light emitting element LD2 is connected. The first transistor M1_2 may control an amount of current supplied from the first driving power VDD to the second driving power VSS via the second light emitting element LD2 in response to the voltage of the third node N3_2.

The second transistor M2_2 may be connected between the data line DLj and the third node N3_2. Further, the gate electrode of the second transistor M2_2 may be electrically connected to the first scan line SL1*i*. The second transistor M2_2 may be turned on when the first scan signal GW is supplied to the first scan line SL1*i* to electrically connect the data line DLj and the third node N3_1 to each other.

The first electrode of the third transistor M3_2 may be connected to the second node N2_2, and the second electrode thereof may be electrically connected to the third power line PL3. Further, the gate electrode of the third transistor M3_2 may be electrically connected to the first scan line SL1*i*. The third transistor M3_2 may be turned on when the first scan signal GW is supplied to the first scan line SL1*i* to electrically connect the second node N2_2 and the third power line PL3 to each other.

The first capacitor C1_2 may be connected between the second node N1_2 and the third node N3_2. The first capacitor C1_2 may store and maintain a voltage value depending on a voltage difference applied to opposite electrodes (e.g., both electrodes) thereof.

As shown in FIG. 4, the first sub-pixel SPij may receive a data signal supplied from the data line DLj through the second transistors M2_1 and M2_2, when the first scan signal GW is supplied to the second transistor M2_2 and the second scan signal GI is supplied to the second transistor M2_1.

The second sub-pixel SPi(j−1) may receive a data signal from the data line DLj through the second transistor M2_2, when the first scan signal GW is supplied to the second transistor M2_2.

In other words, as one electrode of the second transistor M2_2 is connected to one electrode of the second transistor M2_1, the voltage of the data signal corresponding to the first and second sub-pixels SPij and SPi(j−1) may be supplied by controlling the first and second scan signals GW and GI.

Accordingly, the display device may supply the voltage of the data signal corresponding to each of the sub-pixels SP without using or including separate demultiplexers, so that power consumption of the display device may be reduced.

Figure 5:
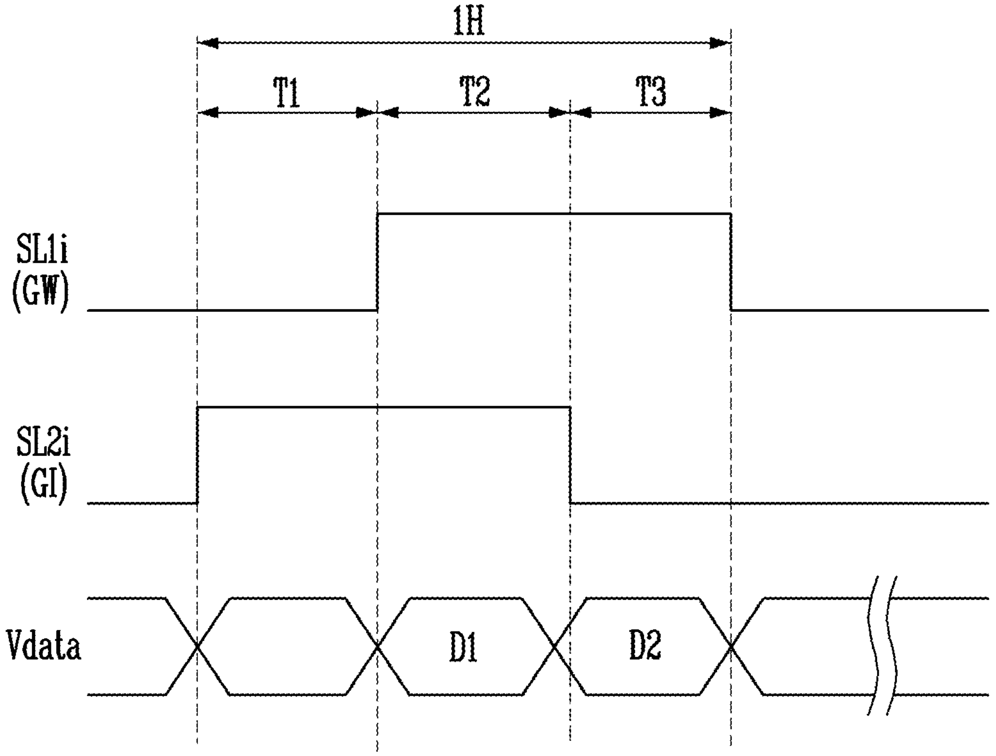
FIG. 5 is a waveform diagram illustrating a driving method of the sub-pixels illustrated in FIG. 4, according to an embodiment of the present disclosure.

FIG. 5 is a waveform diagram illustrating a driving method of the sub-pixels illustrated in FIG. 4, according to an embodiment of the present disclosure.

Referring to FIGS. 2, 4, and 5, a horizontal period 1H (e.g., a specific or predetermined horizontal period) during which data signals are supplied to the first and second sub-pixels SPij and SPi(j−1) may be divided into a first period T1, a second period T2, and a third period T3. A start time of the second period T2 may be after an end time of the first period T1. A start time of the third period T3 may be after an end time of the second period T2.

The data driver 140 may supply the data signal Vdata to the data line DLj during the first period T1 to the third period T3. In some embodiments, the voltage of the data signal Vdata may include a first data voltage D1 and a second data voltage D2. The first data voltage D1 may correspond to that of the first sub-pixel SPij, and the second data voltage D2 may correspond to that of the second sub-pixel SPi(j−1). In other words, the first sub-pixel SPij may emit light based on the first data voltage D1, and the second sub-pixel SPi(j−1) may emit light based on the second data voltage D2.

The scan driver 130 (e.g., the first scan driver 132) may supply the first scan signal GW to the first scan line SL1*i* during the second and third periods T2 and T3.

The scan driver 130 (e.g., the second scan driver 134) may supply the second scan signal GI to the second scan line SL2*i* during the first and second periods T1 and T2.

As the first scan signal GW is not supplied and the second scan signal GI is supplied during the first period T1, the third nodes N3_1 and N3_2 may be connected to each other. Accordingly, the voltages of the third nodes N3_1 and N3_2 of the first transistors M1_1 and M1_2 may be the same or substantially the same as each other. For example, the voltage of each of the third nodes N3_1 and N3_2 may be half of the sum of a voltage of the data signal of the first sub-pixel SPij in a previous frame and a voltage of the data signal of the second sub-pixel SPi(j−1) in a previous frame, as shown in Equation 1.

$$VN3 = \frac{Vdata1_{pre} + Vdata2_{pre}}{2} \qquad \text{Equation 1}$$

Referring to Equation 1, VN3 may represent a voltage of each of the third nodes N3_1 and N3_2. A first preliminary data voltage $Vdata1_{pre}$ may be a voltage of the data signal supplied to the first sub-pixel SPij in the previous frame, and a second preliminary data voltage $Vdata2_{pre}$ may be a voltage of the data signal supplied to the first sub-pixel SPi(j−1) in the previous frame.

However, according to some embodiments, the first period T1 may be omitted as needed or desired. This will be described in more detail below with reference to FIG. 10.

The second period T2 may be a period in which the first data voltage D1 of the data signal Vdata is supplied to the third nodes N3_1 and N3_2, and the initialization power supply Vint is supplied to the second nodes N2_1 and N2_2. As the first and second scan signals GW and GI are supplied during the second period T2, a voltage corresponding to the difference between the first data voltage D1 and the voltage of the initialization power supply Vint may be stored in the first capacitors C1_1 and C1_2.

The third period T3 may be a period in which the second data voltage D2 of the data signal Vdata is supplied to the third node N3_2, and the initialization power Vint is supplied to the second nodes N2_1 and N2_2. As the first scan signal GW is supplied and the second scan signal GI is not supplied during the third period T3, a voltage corresponding to the difference between the second data voltage D2 and the voltage of the initialization power Vint may be stored in the first capacitor C1_2, and the first capacitor C1_1 may maintain or substantially maintain the stored voltage during the second period T2.

As shown in FIG. 5, during one horizontal period, the supply stop time of the second scan signal GI may be earlier than the supply stop time of the first scan signal GW. For example, the supply stop time of the second scan signal GI may be the end time of the second period T2. The supply stop time of the first scan signal GW may be the end time of the third period T3.

Accordingly, by controlling the first and second scan signals GW and GI, the voltages D1 and D2 of the data signal (Vdata) corresponding to the first and second sub-pixels SPij and SPi(j−1) may be supplied.

Figure 6:
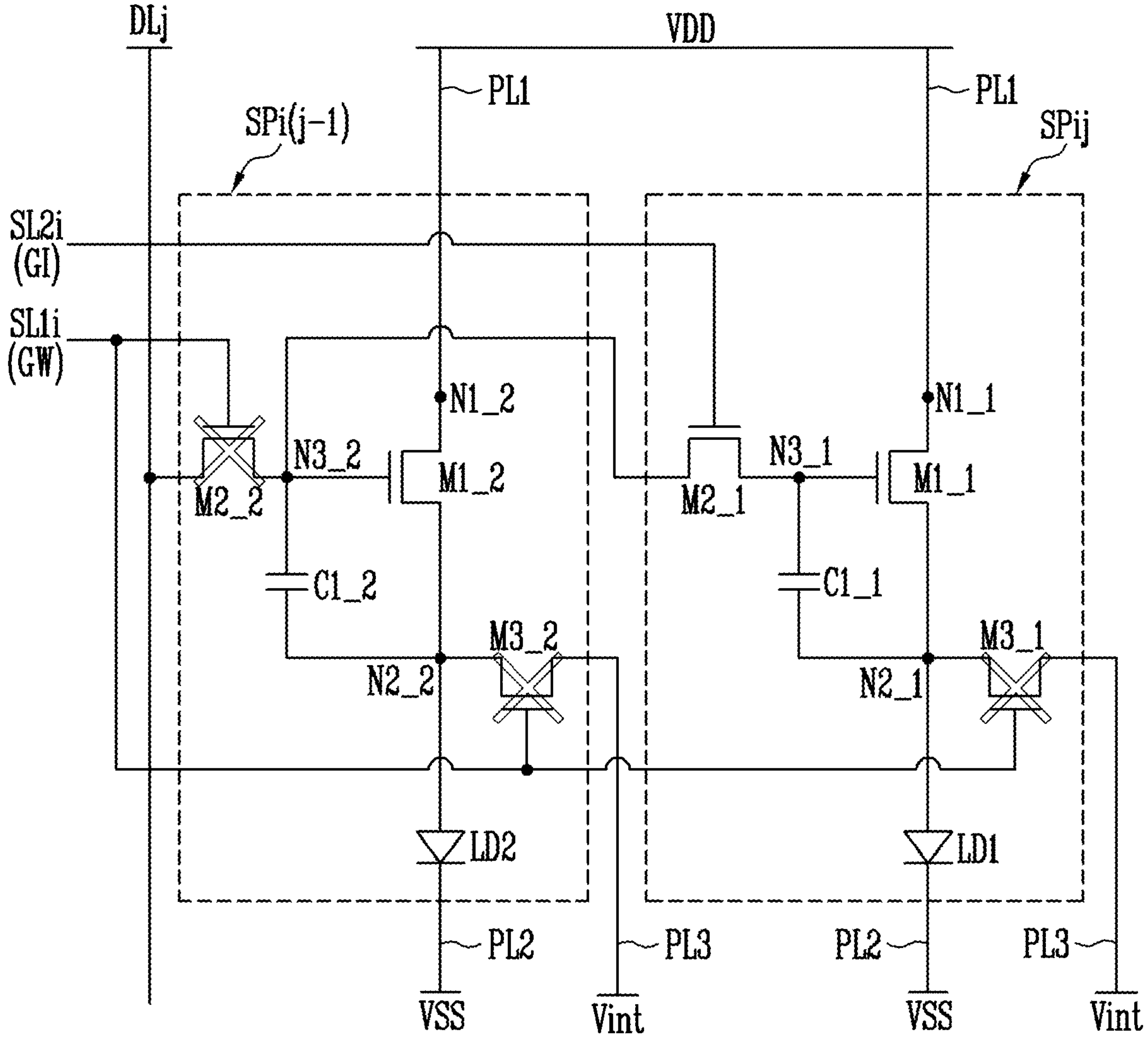
FIGS. 6-8 are circuit diagrams showing an operation process of a pixel according to signals illustrated in FIG. 5.
Figure 7:
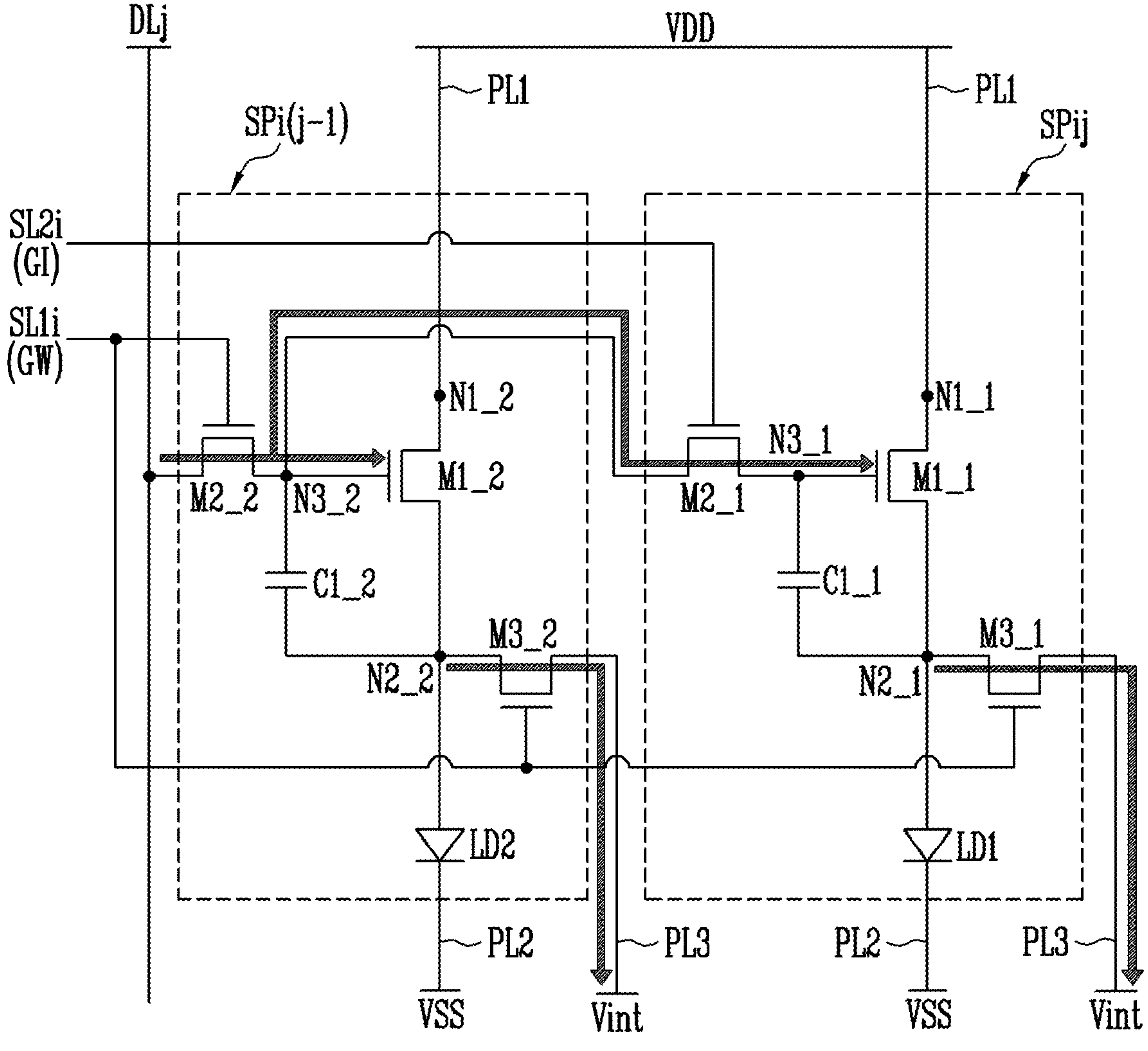
Figure 8:
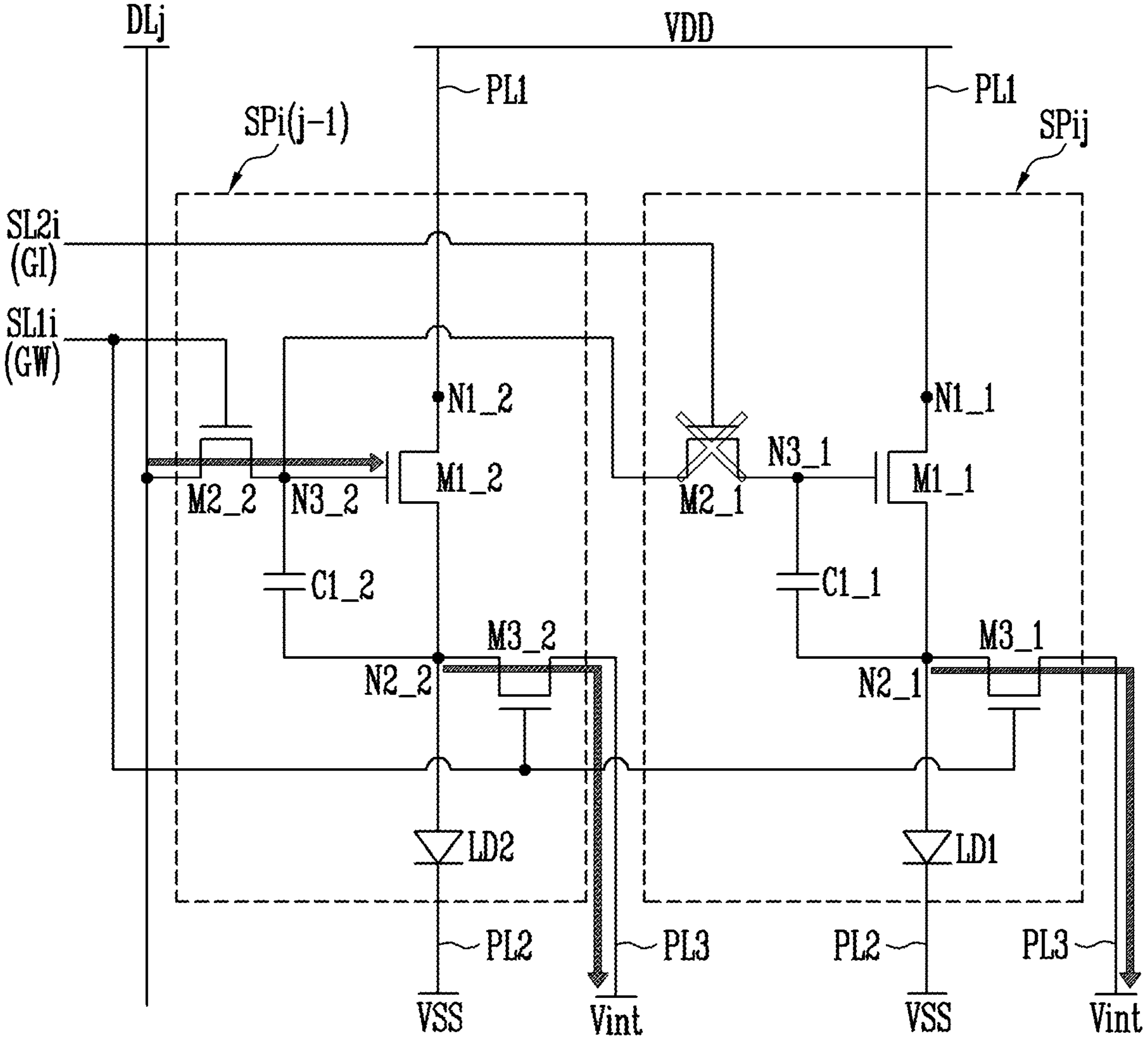

FIGS. 6 through 8 are circuit diagrams showing an operation process of a pixel according to the signals illustrated in FIG. 5. The first and second sub-pixels SPij and SPi(j−1) illustrated in FIGS. 6 to 8 may correspond to the first and second sub-pixels SPij and SPi(j−1) described above with reference to FIG. 5.

Referring to FIGS. 5 and 6, during the first period T1, the second scan signal GI may be supplied to the second scan line SL2*i*, and the first scan signal GW may be not supplied to the first scan line SL1*i*. Accordingly, the second transistor M2_2 of the second sub-pixel SPi(j−1) and the third transistors M3_1 and M3_2 may be in a turn-off state, and the second transistor M2_2 of the first sub-pixel SPij may be in a turn-on state. When the second transistor M2_1 of the first sub-pixel SPij is turned on, the third nodes N3_1 and N3_2 may be connected to each other.

Referring to FIGS. 5 and 7, during the second period T2, the second scan signal GI may be supplied to the second scan line SL2*i*, and the first scan signal GW may be supplied to the first scan line SL1*i*. Accordingly, the second transistors M2_1 and M2_2 and the third transistors M3_1 and M3_2 may be in the turn-on state.

When the second transistor M2_2 of the second sub-pixel SPi(j−1) is turned on, the voltage Vdata of the data signal may be supplied from the data line DLj to the third node N3_2. When the second transistor M2_1 of the first sub-pixel SPij is turned on, the third nodes N3_1 and N3_2 may be connected to each other. Accordingly, the data signal Vdata may be supplied from the data line DLj to the third node N3_1. As shown in FIG. 5, the first data voltage D1 of the data signal Vdata may be supplied to the third nodes N3_1 and N3_2.

Referring to FIGS. 5 and 8, during the third period T3, the first scan signal GW may be supplied to the first scan line SL1*i*, and the second scan signal GI may be not supplied to the second scan line SL2*i*. Accordingly, the second transistor M2_2 of the second sub-pixel SPi(j−1) and the third transistors M3_1 and M3_2 may maintain a turn-on state, and the second transistor M2_1 of the second sub-pixel SPi(j−1) may be in a turn-off state.

When the second transistor M2_2 of the second sub-pixel SPi(j−1) is turned on, the data signal Vdata may be supplied from the data line DLj to the third node N3_2. As shown in FIG. 5, the second data voltage D2 of the data signal may be supplied to the third node N3_2.

When the second transistor M2_1 of the first sub-pixel SPij is turned off, the data signal Vdata may be not supplied from the data line DLj to the third node N3_1. Accordingly, the first capacitor C1_1 may maintain or substantially maintain the stored voltage during the second period T2.

Figure 9:
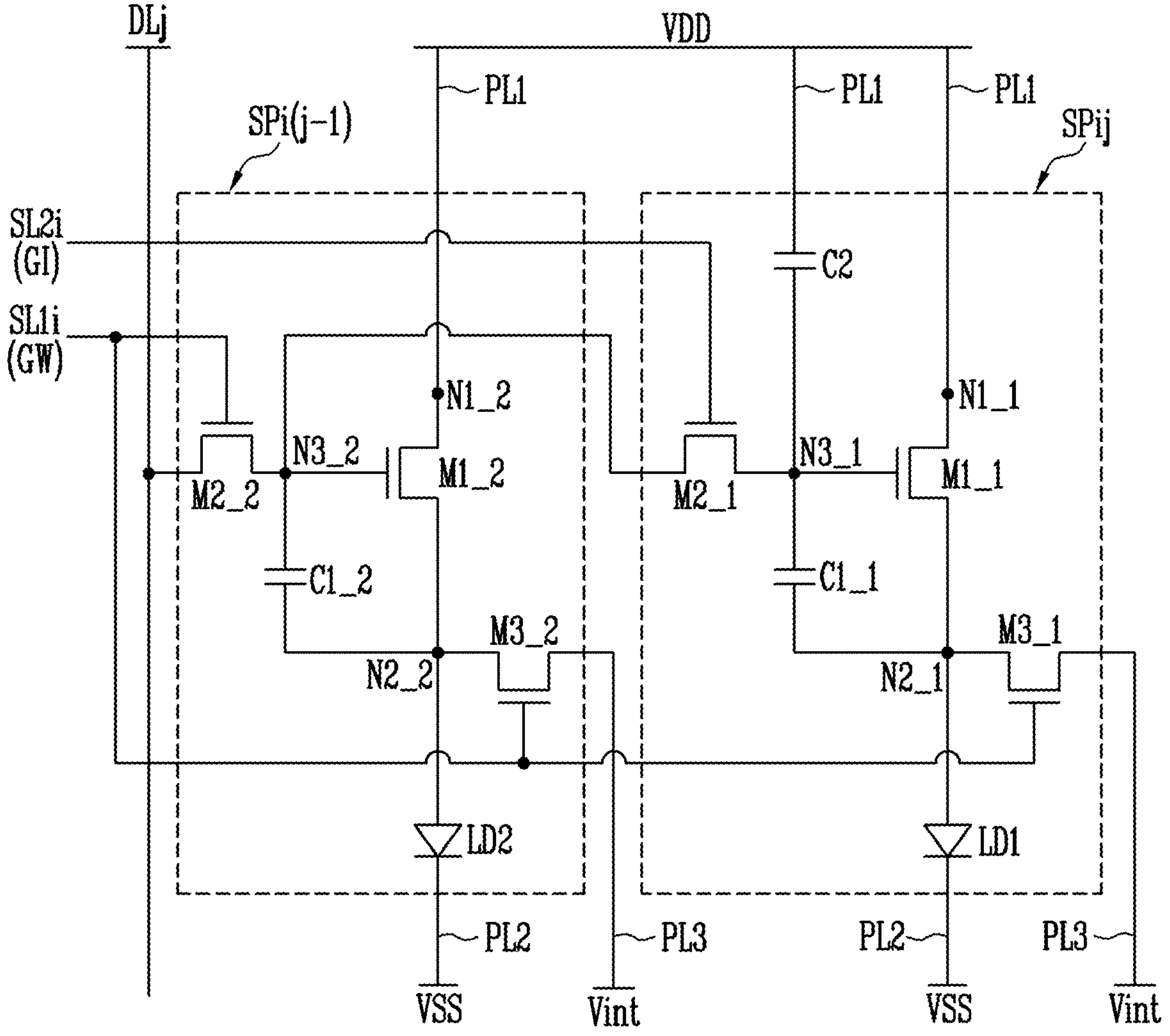
FIG. 9 is a circuit diagram illustrating the sub-pixels illustrated in FIG. 4, according to an embodiment of the present disclosure.

FIG. 9 is a circuit diagram illustrating the sub-pixels illustrated in FIG. 4, according to an embodiment of the present disclosure. Referring to FIG. 9, the first sub-pixel SPij and the second sub-pixel SPi(j−1) are shown.

Because the first sub-pixel SPij and the second sub-pixel SPi(j−1) may be the same or substantially the same as (or similar to) the first sub-pixel SPij and the second sub-pixel SPi(j−1) described above with reference to FIG. 4, redundant description thereof may not be repeated.

The first sub-pixel SPij may include the first to third transistors M1_1 to M3_1, the first capacitor C1_1, and a second capacitor C2. The second capacitor C2 may be connected between the first power line PL1 and the third node N3_1. As the first sub-pixel SPij includes the second capacitor C2, a possibility of a difference in a luminance between the first sub-pixel SPij and the second sub-pixel SPi(j−1) may be reduced.

Referring to FIG. 9, the first sub-pixel SPij is shown as including the second capacitor C2, but the present disclosure is not limited thereto, and the second sub-pixel SPi(j−1) may include the second capacitor C2. In this case, the second capacitor C2 may be connected between the first power line PL1 and the third node N3_2.

Figure 10:
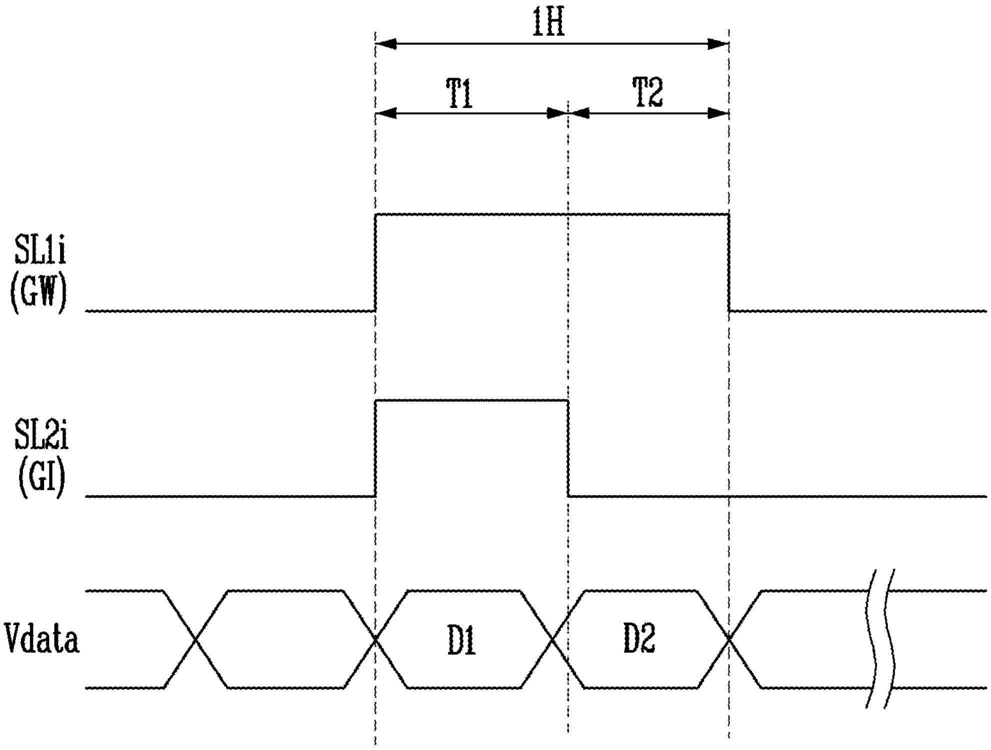
FIG. 10 is a waveform diagram illustrating a driving method of the sub-pixels illustrated in FIG. 4, according to an embodiment of the present disclosure.

FIG. 10 is a waveform diagram illustrating a driving method of the sub-pixels illustrated in FIG. 4, according to an embodiment of the present disclosure.

Referring to FIGS. 2, 4, and 10, a horizontal period 1H (e.g., a specific or predetermined horizontal period) in which the data signals are supplied to the first and second sub-pixels (SPij, SPi(j+1)) may be divided into a first period T1 and a second period T2. A start time of the second period T2 may be after an end time of the first period T1.

The first period T1 and the second period T2 illustrated in FIG. 10 may be the same or substantially the same as (or similar to) the second period T2 and the third period T3 described above with reference to FIG. 5. In other words, FIG. 10 may illustrate a waveform diagram showing an embodiment in which the first period T1 of FIG. 5 is omitted.

The first period T1 may be a period in which the first data voltage D1 of the data signal Vdata is supplied to the third nodes N3_1 and N3_2, and the initialization power supply Vint is supplied to the second nodes N2_1 and N2_2. As the first and second scan signals GW and GI are supplied during the first period T1, a voltage corresponding to the difference between the first data voltage D1 and the voltage of the initialization power supply Vint may be stored in the first capacitors C1_1 and C1_2.

The second period T2 may be a period in which the second data voltage D2 of the data signal Vdata is supplied to the third nodes N3_1 and N3_2, and the initialization power supply Vint is supplied to the second nodes N2_1 and N2_2. As the first scan signal GW is supplied, and the second scan signal GI is not supplied during the second period T2, a voltage corresponding to the difference between the second data voltage D2 and the voltage of the initialization power Vint may be stored in the first capacitor C1_2, and the first capacitor C1_1 may maintain or substantially maintain the stored voltage during the first period T1.

In this case, by controlling the first and second scan signals GW and GI, the voltages D1 and D2 of the data signal (Vdata) corresponding to the first and second sub-pixels SPij and SPi(j−1) may be supplied.

Figure 11:
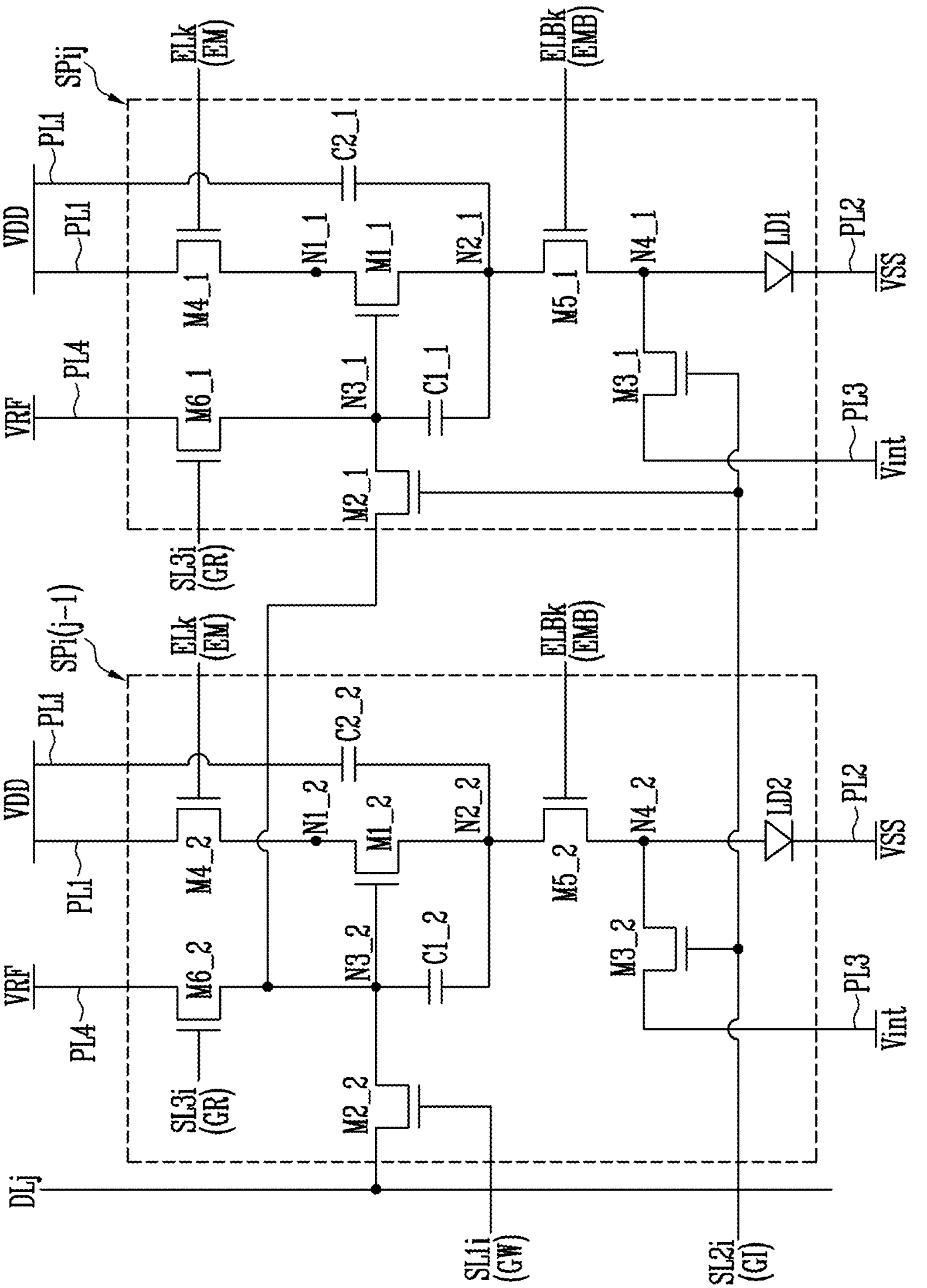
FIG. 11 is a circuit diagram illustrating the sub-pixels shown in FIG. 2, according to an embodiment of the present disclosure.

FIG. 11 is a circuit diagram illustrating the sub-pixels shown in FIG. 2, according to an embodiment of the present disclosure.

Referring to FIG. 11, a first sub-pixel SPij disposed on the i-th horizontal line and the j-th vertical line, and a second sub-pixel SPi(j−1) disposed on the i-th horizontal line and the j−1-th vertical line are shown, where i may be an integer greater than or equal to 0, and j may be an integer greater than or equal to 1.

Each of the first sub-pixel SPij and the second sub-pixel SPi(j−1) may be connected to corresponding signal lines. For example, the first sub-pixel SPij may be connected to the first scan line SL1*i*, the second scan line SL2*i*, a third scan line SL3*i*, the first emission control line ELk, a second emission control line ELBk, and the j-th data line DLj. The second sub-pixel SPi(j−1) may be connected to the first scan line SL1*i*, the second scan line SL2*i*, the third scan line SL3*i*, the first emission control line ELk, the second emission control line ELBk, and the j-th data line DLj. In some embodiments, each of the first sub-pixel SPij and the second sub-pixel SPi(j−1) may be further connected to the first power line PL1, the second power line PL2, the third power line PL3, and the fourth power line PL4.

In other words, the first sub-pixel SPij and the second sub-pixel SPi(j−1) may be connected to the same signal lines (e.g., the first scan line SL1*i*, the second scan line SL2*i*, the third scan line SL3*i*, the first emission control line ELk, the second emission control line ELBk, and the j-th data line DLj) as each other. The second sub-pixel SPi(j−1) may be disposed at the same pixel row as that of the first sub-pixel SPij, and may be disposed at a pixel column adjacent to that of the first sub-pixel SPij. Referring to FIG. 2, the first sub-pixel SPij and the second sub-pixel SPi(j−1) may be included in one pixel PXL.

The first sub-pixel SPij according to an embodiment of the present disclosure may include a first light emitting element LD1, and a pixel circuit for controlling an amount of current supplied to the first light emitting element LD1. The second sub-pixel SPi(j−1) may include a second light emitting element LD2, and a pixel circuit for controlling an amount of current supplied to the second light emitting element LD2.

The first and second light emitting elements LD1 and LD2 illustrated in FIG. 11 may be the same or substantially the same as (or similar to) the first and second light emitting elements LD1 and LD2 described above with reference to FIG. 4. Accordingly, redundant description thereof may not be repeated.

The pixel circuit of the first sub-pixel SPij may include a first transistor M1_1, a second transistor M2_1, a third transistor M3_1, a fourth transistor M4_1, a fifth transistor M5_1, a sixth transistor M6_1, a first capacitor C1_1, and a second capacitor C2_1.

The first transistor M1_1 to the sixth transistor M6_1 may be transistors including a body electrode. For example, each of the first to sixth transistors M1_1 to M6_1 may be a metal oxide semiconductor field effect transistor (MOSFET). In this case, the first transistor M1_1 to the sixth transistor M6_1 may be mounted in a smaller area, and thus, the sub-pixels SP may be applied to a high-resolution panel. The body electrodes of the first to sixth transistors M1_1 to M6_1 may receive a ground voltage.

In some embodiments, each of the first to sixth transistors M1_1 to M6_1 may be formed as an N-type transistor. However, the present disclosure is not limited thereto, and at least one of the first to sixth transistors M1_1 to M6_1 may be formed as a P-type transistor.

The first electrode of the first transistor M1_1 may be connected to a first node N1_1, and the second electrode thereof may be connected to a second node N2_1. The gate electrode of the first transistor M1_1 may be connected to a third node N3_1.

The second transistor M2_1 may be connected between the third node N3_1 and a third node N3_2 of the second sub-pixel SPi(j−1). Further, the gate electrode of the second transistor M2_1 may be electrically connected to the second scan line SL2*i*. The second transistor M2_1 may be turned on when the second scan signal GI is supplied to the second scan line SL2*i* to electrically connect the third nodes N3_1 and N3_2 to each other.

The first electrode of the third transistor M3_1 may be connected to a fourth node N4_1, and the second electrode thereof may be electrically connected to the third power line PL3. Further, the gate electrode of the third transistor M3_1 may be electrically connected to the second scan line SL2*i*. The third transistor M3_1 may be turned on when the second scan signal GI is supplied to the second scan line SL2*i* to electrically connect the fourth node N4_1 and the third power line PL3 to each other.

The first electrode of the fourth transistor M4_1 may be electrically connected to the first power line PL1, and the second electrode thereof may be connected to the first node N1_1. Further, the gate electrode of the fourth transistor M4_1 may be electrically connected to the first emission control line ELk. The fourth transistor M4_1 may be turned on when the first emission signal EM is supplied to the first emission control line ELk to electrically connect the first power line PL1 and the first node N1_1 to each other.

The first electrode of the fifth transistor M5_1 may be connected to the second node N2_1, and the second electrode thereof may be connected to the fourth node N4_1. Further, the gate electrode of the fifth transistor M5_1 may be electrically connected to the second emission control line ELBk. The fifth transistor M5_1 may be turned on when a second emission signal EMB is supplied to the second emission control line ELBk to electrically connect the second node N2_1 and the fourth node N4_1 to each other.

The first electrode of the sixth transistor M6_1 may be connected to the third node N3_1, and the second electrode thereof may be electrically connected to the fourth power line PL4. Further, the gate electrode of the sixth transistor M6_1 may be electrically connected to the third scan line SL3*i*. The sixth transistor M6_1 may be turned on when a third scan signal GR is supplied to the third scan line SL3*i* to electrically connect the third node N3_1 and the fourth power line PL4 to each other.

The first capacitor C1_1 may be connected between the second node N2_1 and the third node N3_1. The first capacitor C1_1 may transmit a change value of the voltage of the second node N2_1 to the third node N3_1. Further, the first capacitor C1_1 may store and maintain a voltage value depending on a voltage difference applied to opposite electrodes (e.g., both electrodes) thereof.

One end of the second capacitor C2_1 may be electrically connected to the first power line PL1, and another end (e.g., an opposite end) thereof may be connected to the second node N2_1. In some embodiments, the other end of the second capacitor C2_1 may be connected to the body electrode of the first transistor M1_1.

In some embodiments, the first capacitor C1_1 and the second capacitor C2_1 may be metal-oxide-metal (MOM) capacitors or metal-insulator-metal (MIM) capacitors.

The pixel circuit of the second sub-pixel SPi(j−1) may include a first transistor M1_2, a second transistor M2_2, a third transistor M3_2, a fourth transistor M4_2, a fifth transistor M5_2, a sixth transistor M6_2, a first capacitor C1_2, and a second capacitor C2_2.

The first to sixth transistors M1_2 to M6_2, the first capacitor C1_2, and the second capacitor C2_2 of the second sub-pixel SPi(j−1) may be the same or substantially the same as (or similar to) the first to sixth transistors M1_2 to M6_2, the first capacitor C1_1, and the second capacitor C2_1 of the first sub-pixel SPij described above, and thus, redundant description thereof may not be repeated.

The first electrode of the first transistor M1_2 may be connected to a first node N1_2, and the second electrode thereof may be connected to a second node N2_2. The gate electrode of the first transistor M1_2 may be connected to a third node N3_2. The first node N1_2 may refer to a node electrically connected to the first power line PL1, and the second node N2_2 may refer to a node to which the first electrode of the second light emitting element LD2 is connected. The first transistor M1_2 may control an amount of current supplied from the first driving power VDD to the second driving power VSS via the second light emitting element LD2 in response to the voltage of the third node N3_2.

The second transistor M2_2 may be connected between the data line DLj and the third node N3_2. Further, the gate electrode of the second transistor M2_2 may be electrically connected to the first scan line SL1*i*. The second transistor M2_2 may be turned on when the first scan signal GW is supplied to the first scan line SL1*i* to electrically connect the data line DLj and the third node N3_2 to each other.

The first electrode of the third transistor M3_2 may be connected to a fourth node N4_2, and the second electrode thereof may be electrically connected to the third power line PL3. Further, the gate electrode of the third transistor M3_2 may be electrically connected to the second scan line SL2*i*. The third transistor M3_2 may be turned on when the second scan signal GI is supplied to the second scan line SL2*i* to electrically connect the fourth node N4_2 and the third power line PL3 to each other.

The first electrode of the fourth transistor M4_2 may be electrically connected to the first power line PL1, and the second electrode thereof may be connected to the first node N1_2. Further, the gate electrode of the fourth transistor M4_2 may be electrically connected to the first emission control line ELk. The fourth transistor M4_2 may be turned on when the first emission signal EM is supplied to the first emission control line ELk to electrically connect the first power line PL1 and the first node N1_2 to each other.

The first electrode of the fifth transistor M5_2 may be connected to the second node N2_2, and the second electrode thereof may be connected to the fourth node N4_2. Further, the gate electrode of the fifth transistor M5_2 may be electrically connected to the second emission control line ELBk. The fifth transistor M5_2 may be turned on when the second emission signal EMB is supplied to the second emission control line ELBk to electrically connect the second node N2_2 and the fourth node N4_2 to each other.

The first electrode of the sixth transistor M6_2 may be connected to the third node N3_2, and the second electrode thereof may be electrically connected to the fourth power line PL4. Further, the gate electrode of the sixth transistor M6_2 may be electrically connected to the third scan line SL3*i*. The sixth transistor M6_2 may be turned on when the third scan signal GR is supplied to the third scan line SL3*i* to electrically connect the third node N3_2 and the fourth power line PL4 to each other.

The first capacitor C1_2 may be connected between the second node N1_2 and the third node N3_2. The first capacitor C1_2 may transmit a change value of the voltage of the second node N2_2 to the third node N3_2. Further, the first capacitor C1_2 may store and maintain a voltage value depending on a voltage difference applied to opposite electrodes (e.g., both electrodes) thereof.

One end of the second capacitor C2_2 may be electrically connected to the first power line PL1, and another end (e.g., an opposite end) thereof may be connected to the second node N2_2. In some embodiments, the other end of the second capacitor C2_2 may be connected to the body electrode of the first transistor M1_2.

As shown in FIG. 11, the first sub-pixel SPij may receive a data signal supplied from the data line DLj through the second transistors M2_1 and M2_2 when the first scan signal GW is supplied to the second transistor M2_2 and the second scan signal GI is supplied to the second transistor M2_1.

The second sub-pixel SPi(j−1) may receive a data signal from the data line DLj through the second transistor M2_2 when the first scan signal GW is supplied to the second transistor M2_2.

In other words, as one electrode of the second transistor M2_2 is connected to one electrode of the second transistor M2_1, the voltage of the data signal corresponding to the first and second sub-pixels SPij and SPi(j−1) may be supplied by controlling the first and second scan signals GW and GI.

Accordingly, the display device may supply the voltage of the data signal corresponding to each of the sub-pixels SP without using or including separate demultiplexers, so a power consumption of the display device may be reduced.

Figure 12:
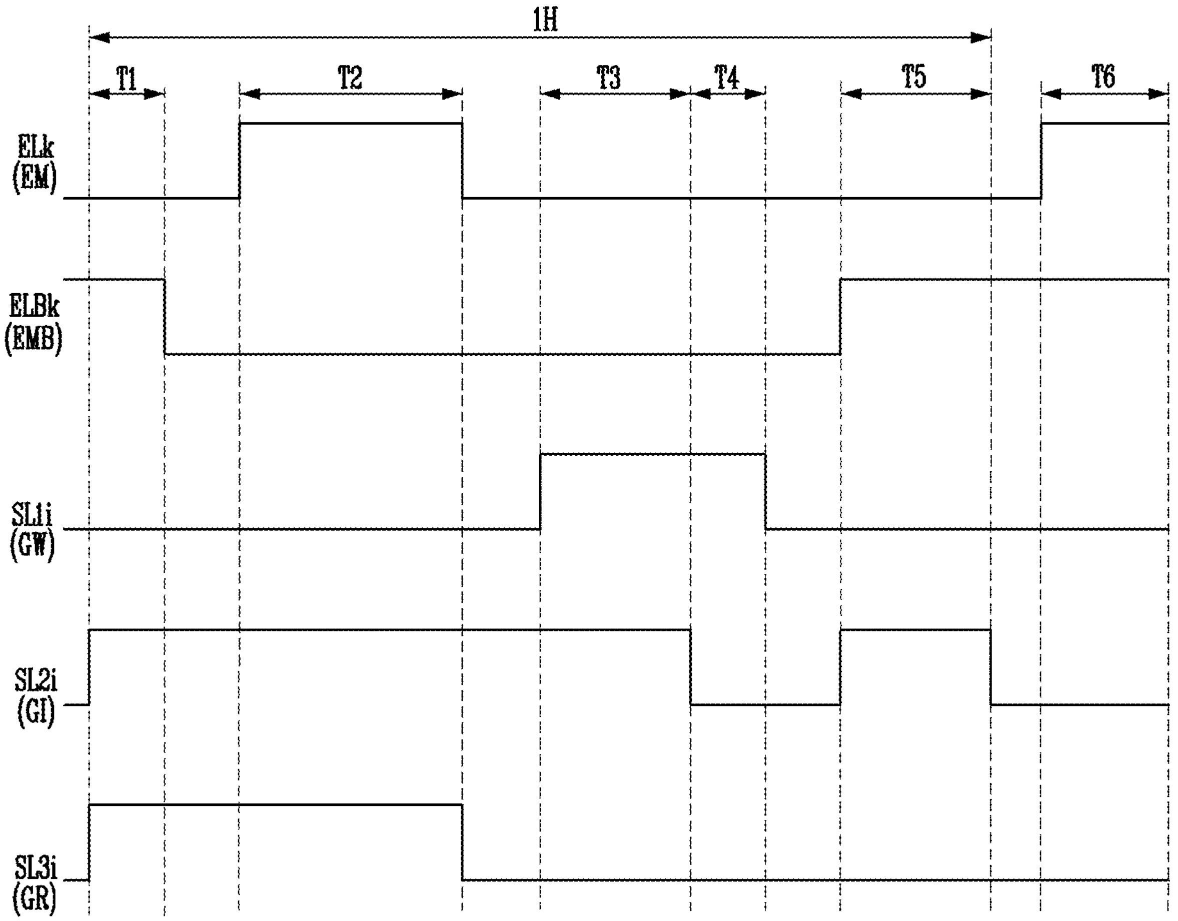
FIG. 12 is a waveform diagram illustrating a driving method of the sub-pixels illustrated in FIG. 11, according to an embodiment of the present disclosure.

FIG. 12 is a waveform diagram illustrating a driving method of the sub-pixels illustrated in FIG. 11, according to an embodiment of the present disclosure.

Referring to FIGS. 2, 11, and 12, a horizontal period 1H (e.g., a specific or predetermined horizontal period) during which the data signals are supplied to the first and second sub-pixels SPij and SPi(j−1) may be divided into a first period T1, a second period T2, a third period T3, a fourth period T4, and a fifth period T5. A start time of the second period T2 may be after an end time of the first period T1. A start time of the third period T3 may be after an end time of the second period T2. A start time of the fourth period T4 may be after an end time of the third period T3. A start time of the fifth period T5 may be after an end time of the fourth period T4.

After the horizontal period 1H, a sixth period T6 in which the light emitting element LD emits light may start. A start time of the sixth period T6 may be after an end time of the fifth period T5.

In some embodiments, margin periods may exist between the first to sixth periods T1 to T6. The margin periods may be periods in consideration of a delay of signals.

The data driver 140 may supply the voltage of the data signal to the data line DLj during the first period T1 to the fifth period T5.

The scan driver 130 (e.g., the first scan driver 132) may supply the first scan signal GW to the first scan line SL1*i* during the third and fourth periods T3 and T4.

The scan driver 130 (e.g., the second scan driver 134) may supply the second scan signal GI to the second scan line SL2*i* during the first to third periods T1 to T3 and the fifth period T5.

The scan driver 130 (e.g., the third scan driver) may supply the third scan signal GR to the third scan line SL3*i* during the first period T1 and the second period T2.

The emission driver 160 may supply the first emission signal EM to the first emission control line ELk during the second period T2 and the sixth period T6.

The emission driver 160 may supply the second emission signal EMB to the second emission control line ELBk during the first period T1, the fifth period T5, and the sixth period T6.

The first period T1 may be a period in which the voltage of the reference power VRF is supplied to the third nodes N3_1 and N3_2, and the voltage of the initialization power Vint is supplied to the second nodes N2_1 and N2_2 and the fourth nodes N4_1 and N4_2. During the first period T1, the anode electrode of the light emitting element LD may be initialized. Further, during the first period T1, the first capacitors C1_1 and C1_2 may store the voltage of the reference power VRF supplied to the third nodes N3_1 and N3_2. The first period T1 may be referred to as an initialization period.

The second period T2 may be a period in which the voltage of the reference power VRF is supplied to the third nodes N3_1 and N3_2, the voltage of the initialization power Vint is supplied to the fourth nodes N4_1 and N4_2, and the voltage of the first driving power VDD is supplied to the first nodes N1_1 and N1_2. During the second period T2, a voltage corresponding to the threshold voltage of the first transistors M1_1 and M1_2 may be stored in the first capacitors C1_1 and C1_2. The second period T2 may be referred to as a threshold voltage compensation period.

The third period T3 may be a period in which the data signals are supplied to the third nodes N3_1 and N3_2, and the initialization power Vint is supplied to the fourth nodes N4_1 and N4_2. As the first and second scan signals GW and GI are supplied during the third period T3, a voltage corresponding to the data signal supplied during the third period T3 may be stored in the first capacitors C1_1 and C1_2.

The fourth period T4 may be a period in which a data signal is supplied to the third node N3_2. As the first scan signal GW is supplied and the second scan signal GI is not supplied during the fourth period T4, a voltage corresponding to the data signal supplied during the fourth period T4 may be stored in the first capacitor C1_2.

In this case, by controlling the first and second scan signals GW and GI, a voltage of the data signal corresponding to each of the first and second sub-pixels SPij and SPi(j+1) may be supplied.

The fifth period T5 may be a period in which the second nodes N2_1 and N2_2 are connected to the fourth nodes N4_1 and N4_2 as the fifth transistors M5_1 and M5_2 are turned on. The second electrodes of the first transistors M1_1 and M1_2 and the anode electrodes of the light emitting elements LD1 and LD2 may have the same or substantially the same voltage as each other. Accordingly, when the light emitting elements LD1 and LD2 emit light in the sixth period T6 after the fifth period T5, an accuracy of the grayscale may be improved.

During the sixth period T6, the first transistors M1_1 and M1_2 may control the amount of current flowing from the first driving power VDD via the light emitting elements LD1 and LD2 to the second driving power VSS in response to the voltage of the third nodes N3_1 and N3_2. In this case, during the sixth period T6, the light emitting elements LD1 and LD2 may emit light having a luminance corresponding to the amount of current supplied from the first transistors M1_1 and M1_2.

As shown in FIG. 12, during one horizontal period 1H, the supply stop time of the second scan signal GI may be earlier than the supply stop time of the first scan signal GW. The supply stop time of the second scan signal GI may refer to a time when the supply is stopped for the first time.

For example, the supply stop time of the second scan signal GI may be the end time of the third period T3. The supply stop time of the first scan signal GW may be the end time of the fourth period T4.

Accordingly, by controlling the first and second scan signals GW and GI, the voltages of data signals corresponding to the first and second sub-pixels SPij and SPi(j−1) may be supplied.

FIGS. 13 through 18 are circuit diagrams illustrating an operation process of a pixel depending on the signals illustrated in FIG. 12.

Figure 13:
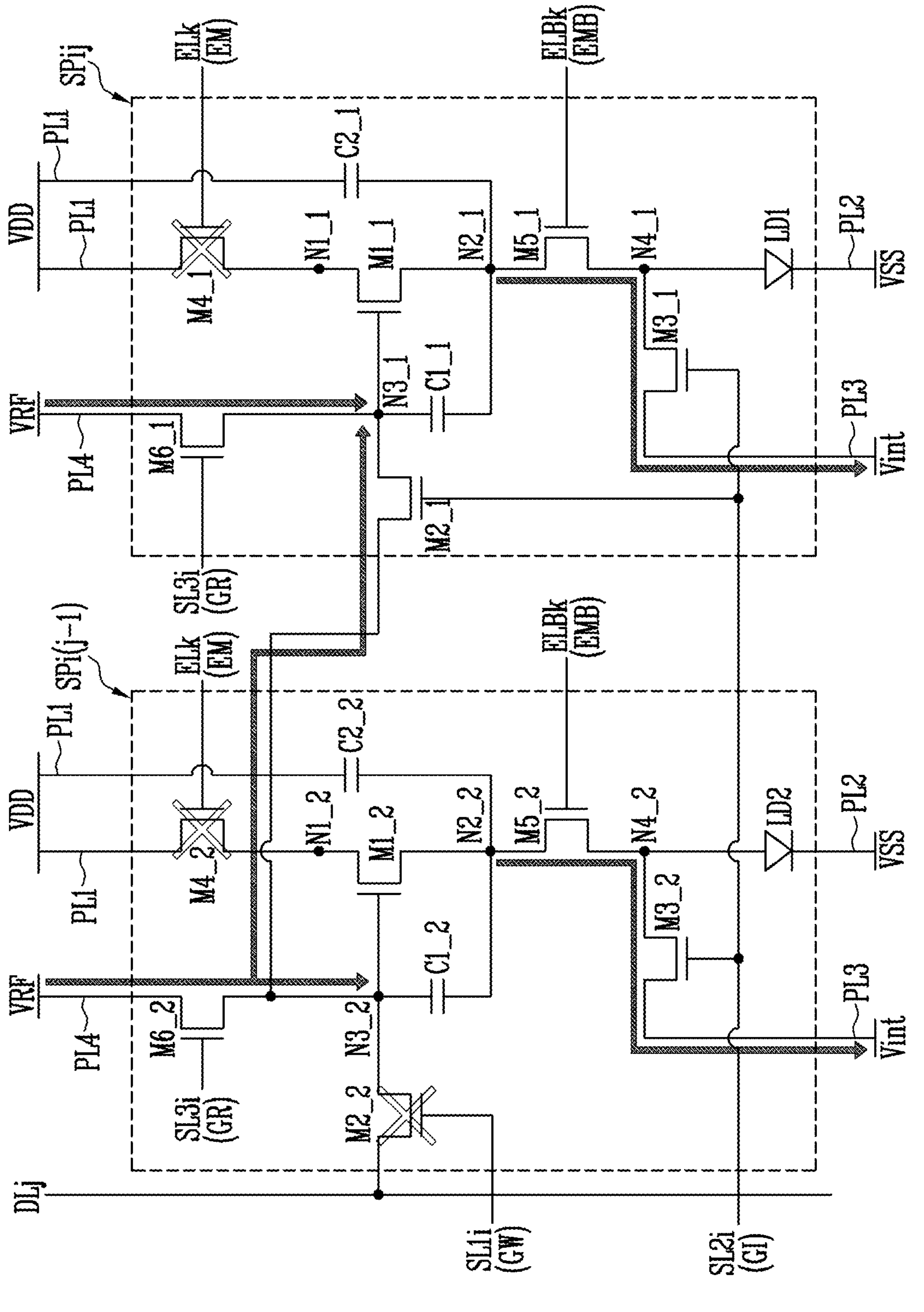
FIGS. 13-18 are circuit diagrams illustrating an operation process of a pixel depending on signals illustrated in FIG. 12.

Referring to FIGS. 12 and 13, during the first period T1, the second scan signal GI may be supplied to the second scan line SL2*i*, the third scan signal GR may be supplied to the third scan line SL3*i*, and the second emission signal EMB may be supplied to the emission control line ELBk. Also, during the first period T1, the first scan signal GW may be not supplied to the first scan line SL1*i*, and the first emission signal EM may be not supplied to the first emission control line ELk.

Accordingly, the second transistor M2_1, the third transistors M3_1 and M3_2, the fifth transistors M5_1 and M5_2, and the sixth transistors M6_1 and M6_2 may be turned on, and the second transistor M2_2 and the fourth transistors M4_1 and M4_2 may be turned off.

When the third transistors M3_1 and M3_2 and the fifth transistors M5_1 and M5_2 are turned on, the voltage of the initialization power Vint may be supplied to the second nodes N2_1 and N2_2. When the sixth transistors M6_1 and M6_2 are turned on, the voltage of the reference power VRF may be supplied to the third nodes N3_1 and N3_2.

In this case, the first capacitors C1_1 and C1_2 may be initialized by the voltage of the reference power VRF and the voltage of the initialization power Vint. For example, the first capacitors C1_1 and C1_2 may charge the voltage of the reference power VRF and the voltage of the initialization power Vint regardless of the voltage charged in the previous period (e.g., a previous frame period) during the first period T1.

During the first period T1, the current supplied from the first transistors M1_1 and M1_2 in response to the voltage of the third nodes N3_1 and N3_2 may supply the initialization power Vint via the third transistors M3_1 and M3_2 and the fifth transistors M5_1 and M5_2. Accordingly, the light emitting elements LD1 and LD2 may maintain or substantially maintain a non-emission state during the first period T1. The first period T1 may be referred to as an initialization period.

Figure 14:
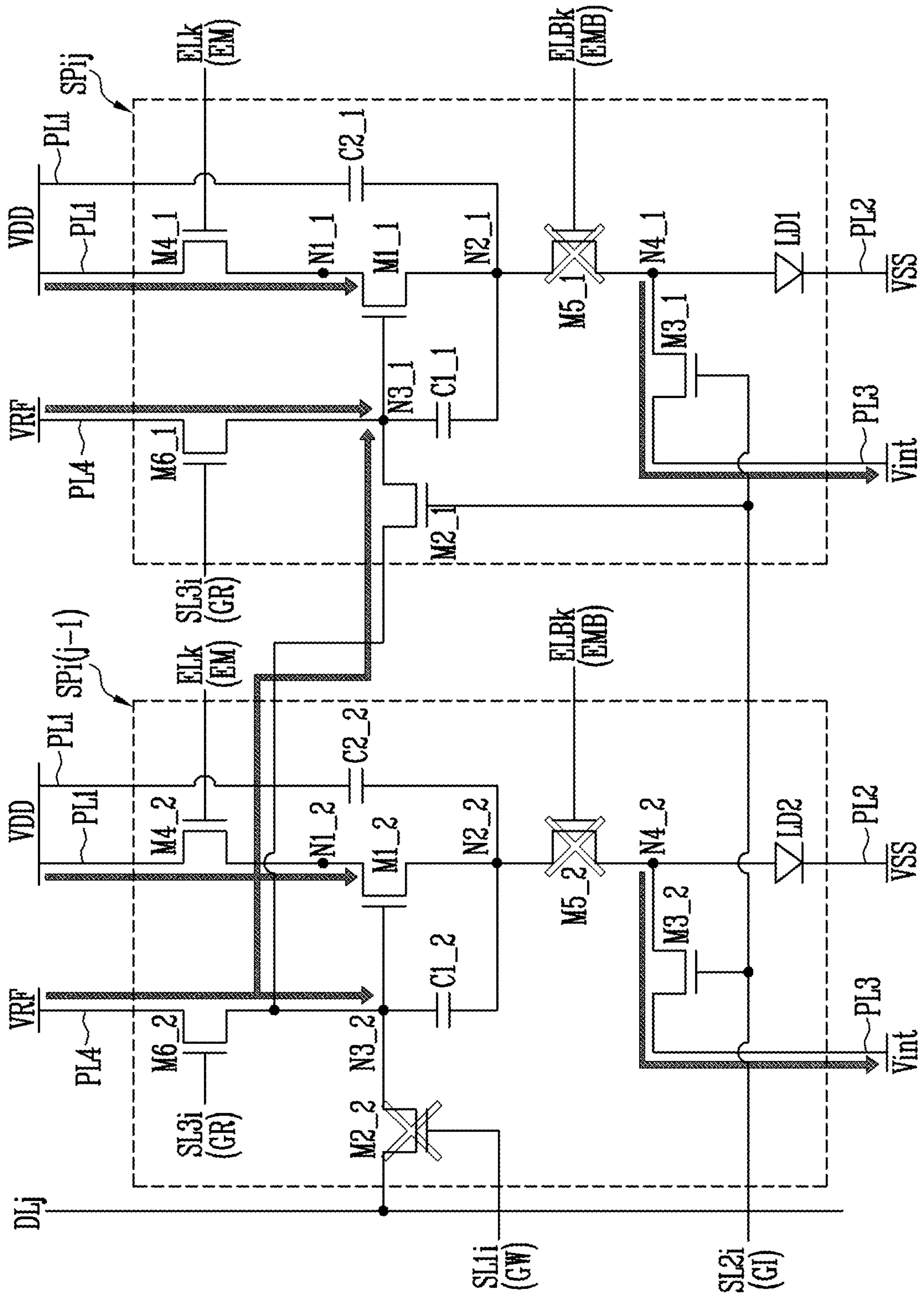

Referring to FIGS. 12 and 14, during the second period T2, the second scan signal GI may be supplied to the second scan line SL2*i*, the third scan signal GR may be supplied to the third scan line SL3*i*, and the first emission signal EM may be supplied to the emission control line ELk. Also, during the second period T2, the first scan signal GW may be not supplied to the first scan line SL1*i*, and the second emission signal EMB may be not supplied to the second emission control line ELBk.

Accordingly, the second transistor M2_1, the third transistors M3_1 and M3_2, and the sixth transistors M6_1 and M6_2 may maintain or substantially maintain the turn-on state, and the fourth transistors M4_1 and M4_2 may be in the turn-on state. Additionally, the second transistor M2_2 may maintain or substantially maintain the turn-off state, and the fifth transistors M5_1 and M5_2 may be in the turn-off state.

Because the fourth transistors M4_1 and M4_2 may be in the turn-on state during the second period T2, the voltage of the first driving power VDD may be supplied to the first nodes N1_1 and N1_2. Because the fifth transistors M5_1 and M5_2 may be in the turn-off state, the voltage of the initialization power Vint may not be supplied to the second nodes N2_1 and N2_2.

In this case, the voltage of the second nodes N2_1 and N2_2 may be lowered from the voltage of the initialization power Vint to a voltage (e.g., VRF−Vth) equal to the voltage of the reference power VRF minus the absolute threshold voltage of the first transistors M1_1 and M1_2. Accordingly, during the second period T2, the first capacitors C1_1 and C1_2 may store the threshold voltages of the first transistors M1_1 and M1_2, respectively. The second period T2 may be referred to as a threshold voltage compensation period.

Because the third transistors M3_1 and M3_2 may be in the turn-on state during the second period T2, the current supplied to the fourth nodes N4_1 and N4_2 may be supplied to the initialization power Vint via the third transistors M3_1 and M3_2. Accordingly, the light emitting elements LD1 and LD2 may maintain or substantially maintain a non-emission state during the second period T2.

Figure 15:
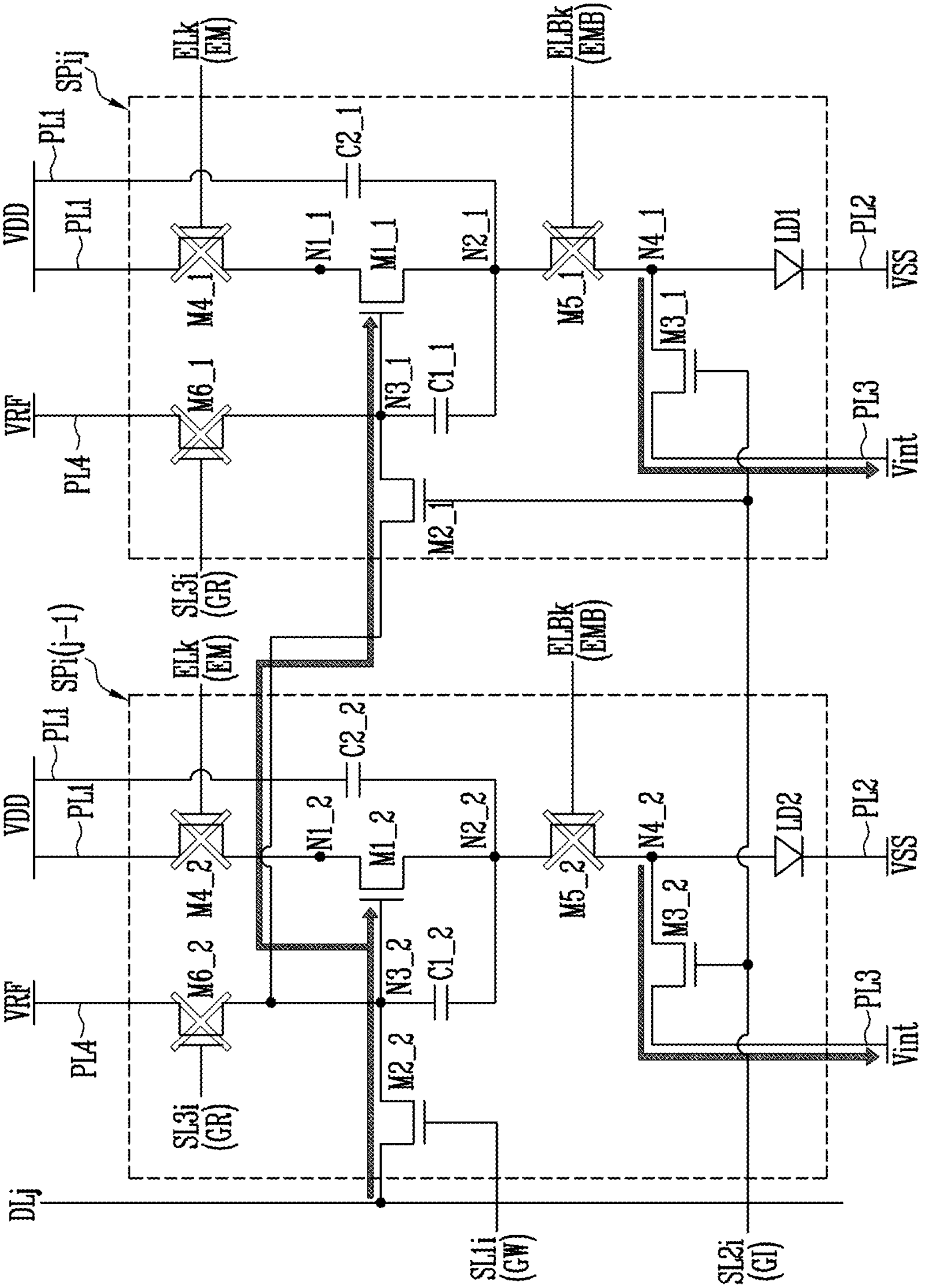

Referring to FIGS. 12 and 15, during the third period T3, the first scan signal GW may be supplied to the first scan line SL1*i*, and the second scan signal GI may be supplied to the second scan line SL2*i*. Also, during the third period T3, the third scan signal GR may be not supplied to the third scan line SL3*i*, the first emission signal EM may be not supplied to the first emission control line ELk, and the second emission signal EMB may be not supplied to the emission control line ELBk.

Accordingly, the second transistor M2_2 and the third transistors M3_1 and M3_2 may maintain or substantially maintain the turn-on state, and the second transistor M2_1 may be in the turn-on state. Additionally, the fifth transistors M5_1 and M5_2 may maintain or substantially maintain the turn-off state, and the fourth transistors M4_1 and M4_2 and the sixth transistors M6_1 and M6_2 may be in the turn-off state.

As the second transistors M2_1 and M2_2 are in the turn-on state, a data signal may be supplied from the data line DLj. In this case, the voltage of each of the second nodes N2_1 and N2_2 may defined by Equation 2.

$$VN2_1 = VRF - Vth + \frac{C1_1}{C1_1 + C1_2}(D1 - VRF) \quad \text{Equation 2}$$

Referring to Equation 2, VN21 may represent the voltage of the second node N2_1 of the first sub-pixel SPij. The second node N2_2 of the second sub-pixel SPi(j−1) may have the same or substantially the same voltage as that of the second node N2_1 of the first sub-pixel SPij. The first data voltage D1 may be the voltage of a data signal provided to the data line DLj during the third period T3. C11 may be the capacity of the first capacitor C1_1. C12 may be the capacity of the second capacitor C2_1.

As the first and second scan signals GW and GI are supplied during the third period T3, the first data voltage D1 may be provided to the third nodes N3_1 and N3_2.

Accordingly, a voltage value depending on a voltage difference between the third nodes N3_1 and N3_2 and the second nodes N2_1 and N2_2 may be stored in the first capacitors C1_1 and C1_2. In other words, a voltage reflecting the first data voltage D1 supplied during the third period T3 may be stored in the first capacitors C1_1 and C1_2.

Figure 16:
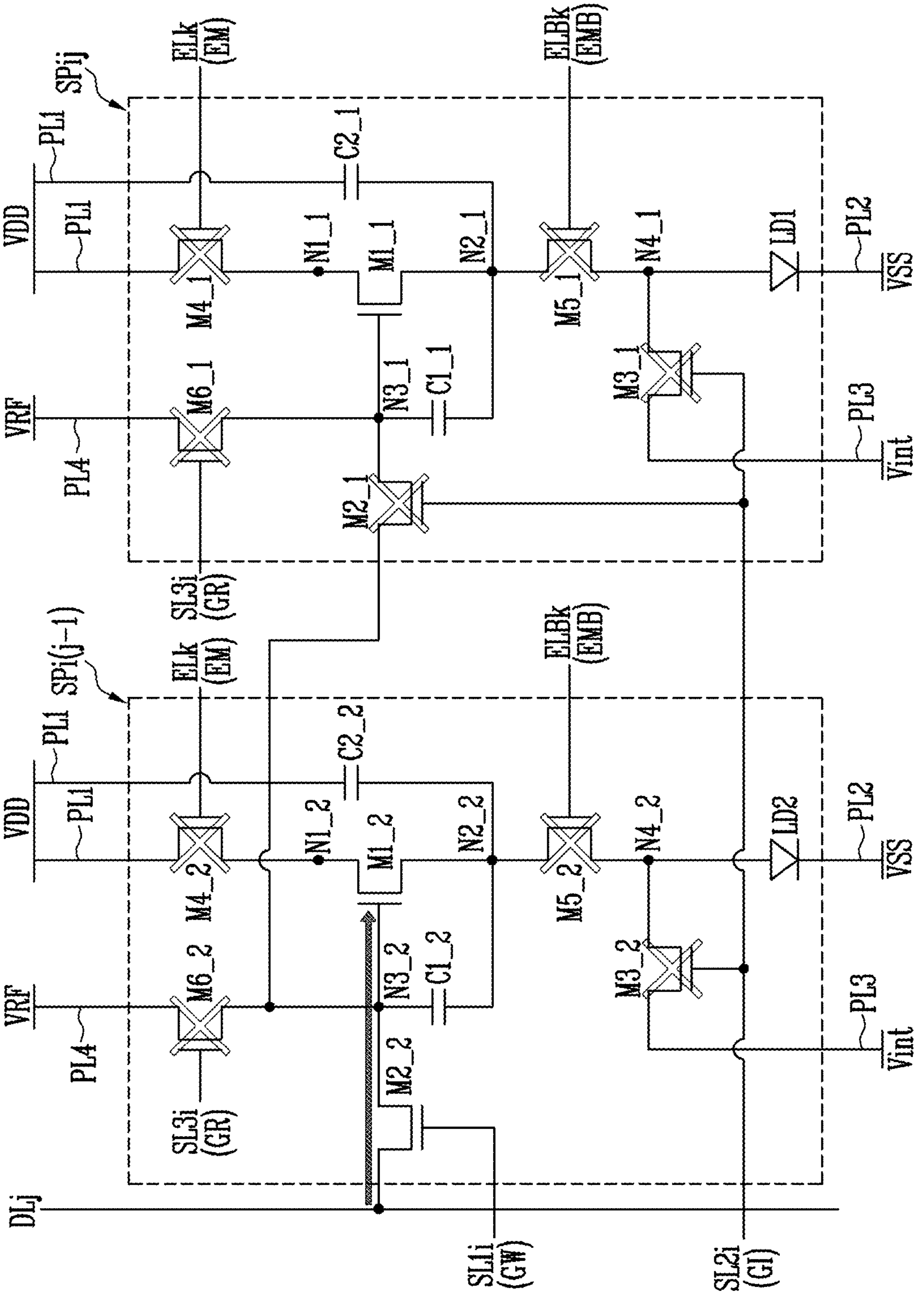

Referring to FIGS. 12 and 16, the first scan signal GW may be supplied to the first scan line SL1*i* during the fourth period T4. Also, during the fourth period T4, the second scan signal GI may be not supplied to the second scan line SL2*i*, the third scan signal GR may be not supplied to the third scan line SL3*i*, the first emission signal EM may be not supplied to the first emission control line ELk, and the second emission signal EMB may be not supplied to the second emission control line ELBk.

Accordingly, the second transistor M2_2 may maintain or substantially maintain the turn-on state. Then, the second transistor M2_1 and the third transistors M3_1 and M3_2 may be in the turn-off state, and the fourth transistors M4_1 and M4_2, the fifth transistors M5_1 and M5_2, and the sixth transistors M6_1 and M6_2 may maintain or substantially maintain the turn-off state.

As the second transistor M2_1 is in the turn-off state, the data signal may be not supplied from the data line DLj to the third node N3_1, and the data signal may be supplied from the data line DLj only to the third node N3_2. In this case, the voltage of the second node N2_2 may be defined by Equation 3.

$$VN2_2 = VRF - Vth + \frac{C1_1}{C1_1 + C1_2}(D2 - VRF) \quad \text{Equation 3}$$

Referring to Equation 3, $VN2_2$ may represent the voltage of the second node N2_2 of the second sub-pixel SPi(j−1). The second data voltage D2 may be the voltage of a data signal provided to the data line DLj during the fourth period T4.

As the first scan signal GW is supplied during the fourth period T4, the second data voltage D2 may be provided to the third node N3_2. Additionally, as the second scan signal GI is not supplied, the second data voltage D2 may not be provided to the third node N3_1.

Accordingly, a voltage value depending on a voltage difference between the third node N3_2 and the second node N2_2 may be stored in the first capacitor C1_2. In other words, a voltage reflecting the second data voltage D2 supplied during the fourth period T4 may be stored in the first capacitor C1_2, and the voltage stored in the first capacitor C1_1 may be maintained or substantially maintained during the third period T3.

As such, by controlling the first and second scan signals GW and GI, a voltage of the data signal corresponding to each of the first and second sub-pixels SPij and SPi(j+1) may be supplied.

Figure 17:
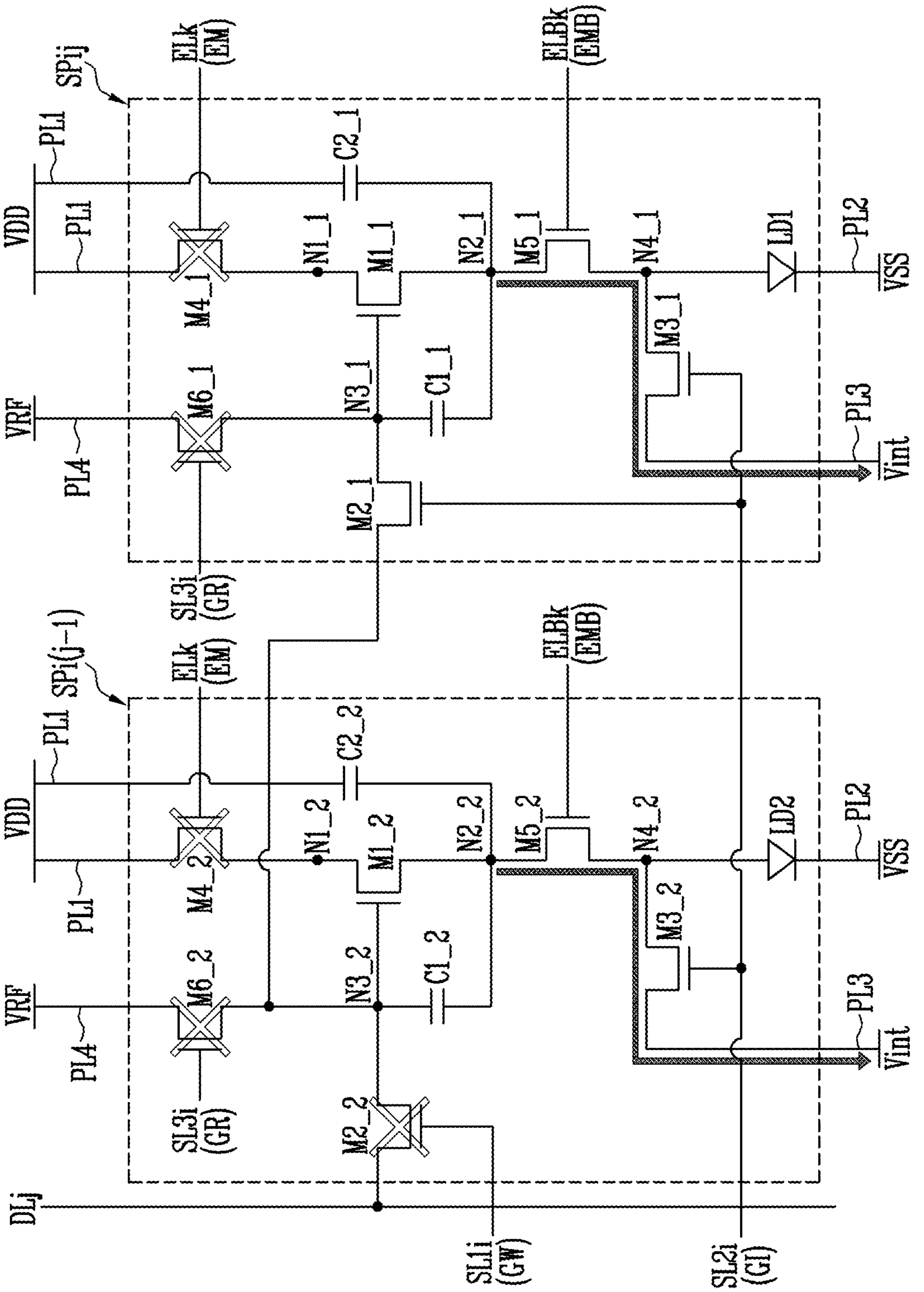

Referring to FIGS. 12 and 17, during the fifth period T5, the second scan signal GI may be supplied to the second scan line SL2*i*, and the second emission signal EMB may be supplied to the second emission control line ELBk. Also, during the fifth period T5, the first scan signal GW may be not supplied to the first scan line SL1*i*, the third scan signal GR may be not supplied to the third scan line SL3*i*, and the first emission signal EM may be not supplied to the first emission control line ELk.

Accordingly, the second transistor M2_1, the third transistors M3_1 and M3_2, and the fifth transistors M5_1 and M5_2 may be in the turn-on state. The second transistor M2_2 may be in the turn-off state, and the fourth transistors M4_1 and M4_2 and the sixth transistors M6_1 and M6_2 may maintain or substantially maintain the turn-off state.

As the third transistors M3_1 and M3_2 and the fifth transistors M5_1 and M5_2 are in the turn-on state, the second electrodes of the first transistors M1_1 and M1_2 and the anode electrodes of the light emitting elements LD1 and LD2 may have the same or substantially the same voltage as each other. Accordingly, when the light emitting elements LD1 and LD2 emit light in the sixth period T6 after the fifth period T5, the accuracy of the grayscale may be improved. Referring to FIGS. 12 and 17, As the third transistors M3_1 and M3_2 and the fifth transistors M5_1 and M5_2 are in the turn-on state, the second node N2_1 and the fourth node N4_1 may have the same voltage, the second node N2_2 and the fourth node N4_2 may have the same voltage.

In some embodiments, the current supplied to the second nodes N2_1 and N2_2 may be supplied to the initialization power Vint. Accordingly, during the fifth period T5, the light emitting elements LD1 and LD2 may be in a non-emission state, thereby accurately expressing the grayscale expression of the display device 100. For example, the voltage of the second nodes N2_1 and N2_2 may increase to a voltage higher than the desired voltage during the third and fourth periods T3 and T4. Accordingly, an unintended current may be supplied to the light emitting elements LD1 and LD2. For example, even when a black grayscale is implemented in the pixel PXij, the light emitting elements LD1 and LD2 may temporarily emit light. According to an embodiment of the present disclosure, the current supplied from the first transistors M1_1 and M1_2 may be supplied to the initialization power Vint during the fifth period T5, and thus, the light emitting elements LD1 and LD2 can be prevented from emitting the unintended light, and the accuracy of the grayscale of the light emitting elements LD1 and LD2 may be improved during the sixth period T6.

Figure 18:
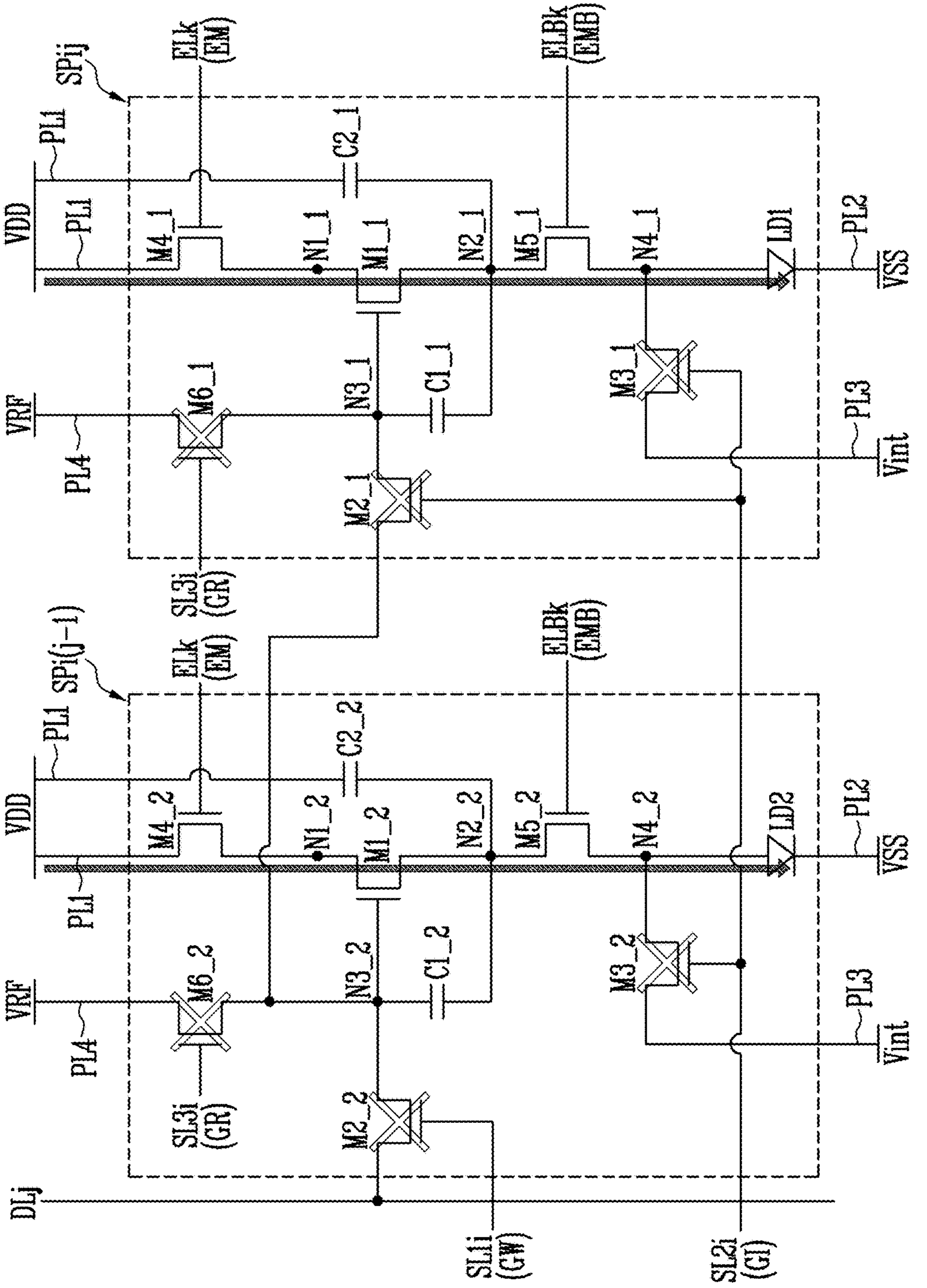

Referring to FIGS. 12 and 18, during the sixth period T6, the supply of the first scan signal GW to the first scan line SL1*i* may be stopped, the supply of the second scan signal GI to the second scan line SL2*i* may be stopped, and the supply of the third scan signal GR to the third scan line SL3*i* may be stopped. Then, during the sixth period T6, the first emission signal EM may be supplied to the first emission control line ELk, and the second emission signal EMB may be supplied to the second emission control line ELBk.

Accordingly, the second transistors M2_1 and M2_2 and the third transistors M3_1 and M3_2 may be in the turn-off state, and the sixth transistors M6_1 and M6_2 may maintain or substantially maintain the turn-off state. The fourth transistors M4_1 and M4_2 may be in the turn-on state, and the fifth transistors M5_1 and M5_2 may maintain or substantially maintain the turn-on state.

As such, the first transistors M1_1 and M1_2 may control the amount of current supplied from the first driving power VDD via the light emitting elements LD1 and LD2 to the second driving power VSS in response to the voltages of the third nodes N3_1 and N3_2, respectively. During the sixth period T6, the light emitting elements LD1 and LD2 may generate light having a luminance corresponding to the amount of driving current supplied from the first transistors M1_1 and M1_2.

Figure 19:
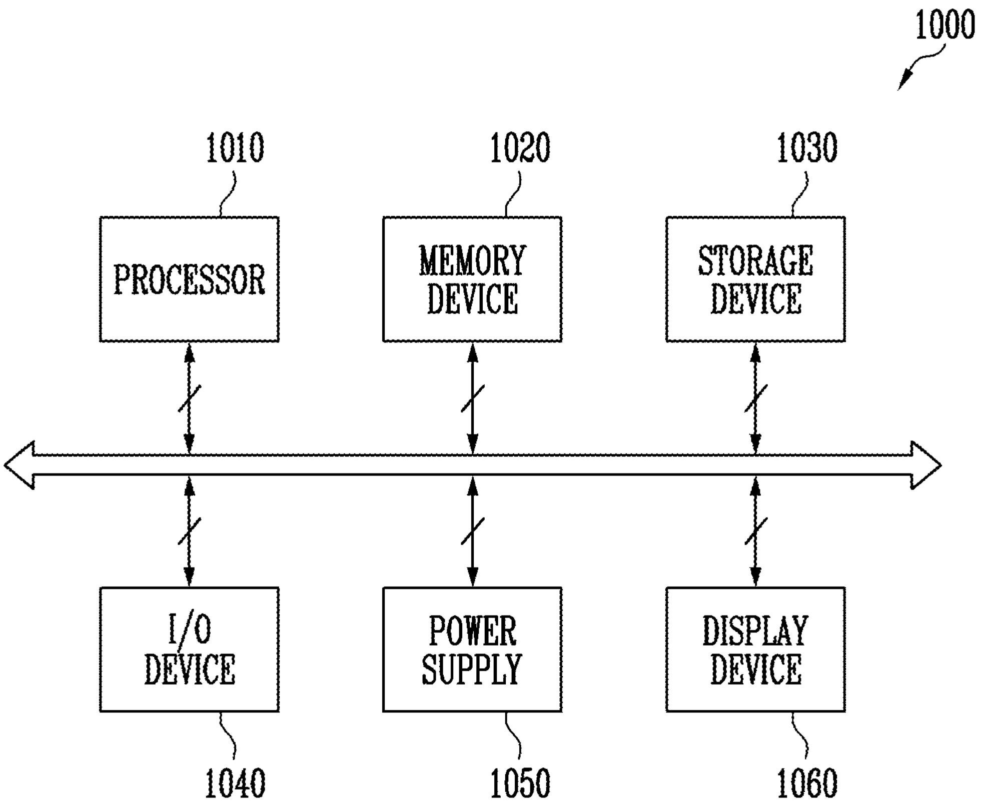
FIG. 19 is a block diagram illustrating an electronic device in accordance with embodiments of the present disclosure.
Figure 20:
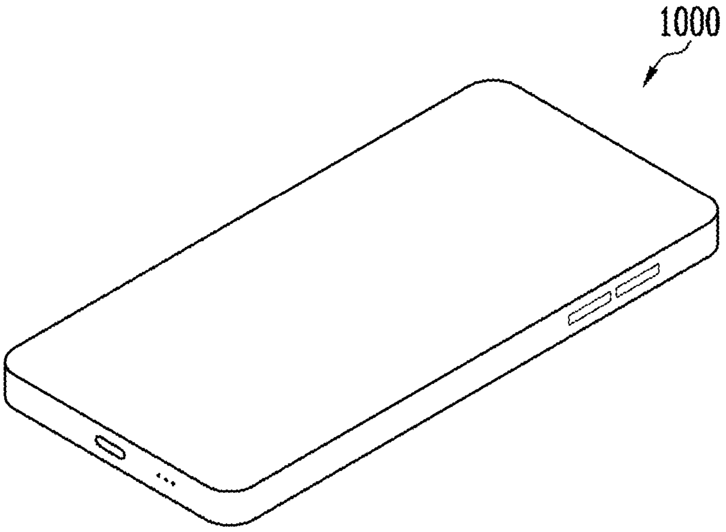
FIG. 20 is a schematic diagram illustrating an example where the electronic device of FIG. 19 is implemented as a smartphone.
Figure 21:
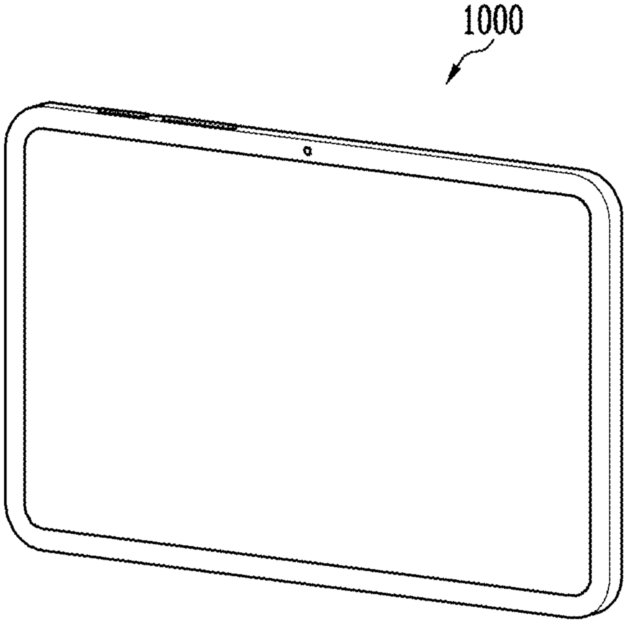
FIG. 21 is a schematic diagram illustrating an example where the electronic device of FIG. 19 is a tablet computer.

FIG. 19 is a block diagram illustrating an electronic device 1000 in accordance with embodiments of the present disclosure. FIG. 20 is a diagram illustrating an example where the electronic device 1000 of FIG. 19 is a smartphone. FIG. 21 is a schematic diagram illustrating an example where the electronic device 1000 of FIG. 19 is a tablet computer.

Referring to FIGS. 19 to 21, the electronic device 1000 may include a processor 1010, a memory device 1020, a storage device 1030, an input/output (I/O) device 1040, a power supply 1050, and a display device 1060. The display device 1060 may be the display device of FIG. 2. The electronic device 1000 may further include various ports for communication with a video card, a sound card, a memory card, a USB device, or other systems. In an embodiment, as illustrated in FIG. 20, the electronic device 1000 may be implemented as a smartphone. In an embodiment, as illustrated in FIG. 21, the electronic device 1000 may be implemented as a table computer. However, the aforementioned examples are illustrative, and the electronic device 1000 is not limited to the aforementioned examples. For example, the electronic device 1000 may be implemented as a cellular phone, a video phone, a smart pad, a smartwatch, a navigation device for vehicles, a computer monitor, a laptop computer, a head-mounted display device, and so on.

The processor 1010 may perform specific calculations or tasks. In an embodiment, the processor 1010 may include at least one of a central processing unit, an application processor, a graphic processing unit, a communication processor, an image signal processor, a controller, or the like. The processor 1010 may be connected to other components through an address bus, a control bus, a data bus, and the like. In an embodiment, the processor 1010 may be connected to an expansion bus such as a peripheral component interconnect (PCI) bus. In an embodiment, the processor 1010 may provide input image data to the display device 1060. Hence, the display device 1060 may display an image based on the input image data provided from the processor 1010.

The memory device 1020 may store data needed to perform the operation of the electronic device 1000. The memory device 1020 may function as a working memory and/or a buffer memory for the processor 1010. For example, the memory device 1020 may include one or more volatile memory devices such as a dynamic random access memory (DRAM) device, a static random access memory (SRAM) device, and a mobile DRAM device.

The storage device 1030 may store data in response to control signals or data from the processor 1010. The storage device 1030 may include one or more non-volatile storages to retain the data even when the electronic device 1000 is powered off. In some embodiments, the storage device 1030 may include a solid state drive (SSD), a hard disk drive (HDD), a CD-ROM, or the like.

The I/O device 1040 may include input devices such as a keyboard, a keypad, a touchpad, a touch screen, and a mouse, and output devices such as a speaker and a printer. In an embodiment, the display device 1060 may be integrated with the I/O device 1040.

The power supply 1050 may supply power needed to perform the operation of the electronic device 1000. For example, the power supply 1050 may include a power management integrated circuit (PMIC). In an embodiment, the power supply 1050 may supply power to the display device 1060.

The display device 1060 may display images in response to image data signals and/or control signals from the processor 1010. The display device 1060 may be connected to other components through the buses or other communication links.

The foregoing is illustrative of some embodiments of the present disclosure, and is not to be construed as limiting thereof. Although some embodiments have been described, those skilled in the art will readily appreciate that various modifications are possible in the embodiments without departing from the spirit and scope of the present disclosure. It will be understood that descriptions of features or aspects within each embodiment should typically be considered as available for other similar features or aspects in other embodiments, unless otherwise described. Thus, as would be apparent to one of ordinary skill in the art, features, characteristics, and/or elements described in connection with a particular embodiment may be used singly or in combination with features, characteristics, and/or elements described in connection with other embodiments unless otherwise specifically indicated. Therefore, it is to be understood that the foregoing is illustrative of various example embodiments and is not to be construed as limited to the specific embodiments disclosed herein, and that various modifications to the disclosed embodiments, as well as other example embodiments, are intended to be included within the spirit and scope of the present disclosure as defined in the appended claims, and their equivalents.

What is claimed is:

1. A display device comprising:

a first sub-pixel and a second sub-pixel connected to a first scan line, a second scan line, a j-th data line, where j is an integer greater than or equal to 1, and emission control lines, the first scan line being configured to receive a first scan signal, and the second scan line being configured to receive a second scan signal, wherein the first sub-pixel is located in an i-th pixel row, where i is an integer greater than or equal to 0, and a j-th pixel column, and comprises:

a first transistor connected between a first node and a second node, and comprising a gate electrode connected to a third node;

a second transistor connected between the third node and a fourth node, and configured to be turned on when the second scan signal is supplied to the second scan line;

a third transistor connected between the first node and a first power line configured to receive a first driving power, and configured to be turned on when a first emission signal is supplied to a first emission control line from among the emission control lines;

a fourth transistor connected between the second node and a fifth node, and configured to be turned on when a second emission signal is supplied to a second emission control line from among the emission control lines;

a first capacitor connected between the second node and the third node; and a first light emitting element connected between the fifth node and a second power line configured to receive a second driving power, and wherein the second sub-pixel is located in the i-th pixel row and a j−1-th pixel column, and comprises:

a fifth transistor connected between a sixth node and a seventh node, and comprising a gate electrode connected to the fourth node;

a sixth transistor connected between the j-th data line and the fourth node, and configured to be turned on when the first scan signal is supplied to the first scan line;

a seventh transistor connected between the sixth node and the first power line, and configured to be turned on when the first emission signal is supplied to the first emission control line;

an eighth transistor connected between the seventh node and an eighth node, and configured to be turned on when the second emission signal is supplied to the second emission control line;

a second capacitor connected between the fourth node and the seventh node; and a second light emitting element connected between the eighth node and the second power line.

2. The display device of claim 1, wherein:

the first sub-pixel further comprises a ninth transistor connected between the fifth node and a third power line configured to receive an initialization power, the ninth transistor being configured to be turned on when the second scan signal is supplied to the second scan line; and the second sub-pixel further comprises a tenth transistor connected between the eighth node and the third power line, the tenth transistor being configured to be turned on when the second scan signal is supplied to the second scan line.

3. The display device of claim 2, wherein:

the first sub-pixel and the second sub-pixel are further connected to a third scan line configured to receive a third scan signal;

the first sub-pixel further comprises an eleventh transistor connected between the third node and a fourth power line configured to receive a reference power, the eleventh transistor being configured to be turned on when the third scan signal is supplied to the third scan line; and the second sub-pixel further comprises a twelfth transistor connected between the fourth node and the fourth power line, the twelfth transistor being configured to be turned on when the third scan signal is supplied to the third scan line.

4. The display device of claim 3, wherein a voltage level of the reference power is higher than a voltage level of the initialization power.

5. The display device of claim 3, wherein:

the first sub-pixel further comprises a third capacitor connected between the second node and the first power line; and the second sub-pixel further comprises a fourth capacitor connected between the seventh node and the first power line.

6. The display device of claim 3, wherein during one horizontal period, a supply stop time of the second scan signal is earlier than a supply stop time of the first scan signal.

7. The display device of claim 3, wherein:

one horizontal period comprises first to fifth periods;

a start time of the second period is after an end time of the first period;

the second scan signal, the third scan signal, and the second emission signal are supplied, and a supply of the first scan signal and the first emission signal is stopped during the first period; and the second scan signal, the third scan signal, and the first emission signal are supplied, and a supply of the first scan signal and the second emission signal is stopped during the second period.

8. The display device of claim 7, wherein:

a start time of the third period is after an end time of the second period; and the first scan signal and the second scan signal are supplied, and a supply of the third scan signal, the first emission signal, and the second emission signal is stopped during the third period.

9. The display device of claim 8, wherein the third node and the fourth node are configured to receive a first data voltage corresponding to the first sub-pixel during the third period.

10. The display device of claim 8, wherein:

a start time of the fourth period is after an end of the third period; and the first scan signal is supplied, and a supply of the second scan signal, the third scan signal, the first emission signal, and the second emission signal is stopped during the fourth period.

11. The display device of claim 10, wherein the fourth node is configured to receive a second data voltage corresponding to the second sub-pixel during the fourth period, wherein after the fifth period, a supply of the first to third scan signals is stopped, and the first and second emission signals are supplied.

12. The display device of claim 10, wherein:

a start time of the fifth period is after an end of the fourth period; and the second scan signal and the second emission signal are supplied, and a supply of the first scan signal, the third scan signal, and the first emission signal is stopped during the fifth period.

* * * * *